(12) United States Patent
Hong

(10) Patent No.: US 11,019,674 B2
(45) Date of Patent: May 25, 2021

(54) METHOD AND APPARATUS FOR CONTROLLING SCELL STATE

(71) Applicant: KT CORPORATION, Gyeonggi-do (KR)

(72) Inventor: Sung-Pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/227,392

(22) Filed: Dec. 20, 2018

(65) Prior Publication Data

US 2019/0200413 A1 Jun. 27, 2019

(30) Foreign Application Priority Data

Dec. 22, 2017 (KR) .................. 10-2017-0178384
Mar. 8, 2018 (KR) .................. 10-2018-0027301
Oct. 18, 2018 (KR) .................. 10-2018-0124177

(51) Int. Cl.
*H04W 76/27* (2018.01)
*H04L 5/00* (2006.01)
(Continued)

(52) U.S. Cl.
CPC .......... *H04W 76/27* (2018.02); *H04L 5/0057* (2013.01); *H04W 16/32* (2013.01); *H04L 5/0073* (2013.01);
(Continued)

(58) Field of Classification Search
CPC . H04W 76/27; H04W 16/32; H04W 36/0069; H04W 52/0206; H04W 36/165;
(Continued)

(56) References Cited

U.S. PATENT DOCUMENTS 9,439,139 B2 * 9/2016 Kwak ............... H04W 52/0206
9,998,960 B2 * 6/2018 Damnjanovic ....... H04W 36/08
(Continued)

FOREIGN PATENT DOCUMENTS

KR  10-2016-0110889 A  9/2016
KR  10-2016-0134849 A  11/2016

OTHER PUBLICATIONS

Qualcomm Incorporated, "Fast SCell Configuration and Activation Through network assisted RRC_Idle mode measurements", R2-1707788, 3GPP TSG-RAN2 Meeting #99, Berlin, Germany, Aug. 21-25, 2017.
(Continued)

*Primary Examiner* — Brian T O Connor
(74) *Attorney, Agent, or Firm* — IP Legal Services, LLC

(57) ABSTRACT

Provided is a method and an apparatus for changing or controlling a state of a secondary cell in carrier aggregation. The method includes receiving secondary cell (SCell) state indication information indicating a state for a SCell from a base station through an RRC message or an MAC control element, causing a state of the SCell to transition into a dormant state when the SCell state indication information indicates the dormant state, and transmitting channel state information reporting for the SCell in the dormant state according to an dormant state CQI report period parameter set separately from an activation state CQI report period parameter.

17 Claims, 16 Drawing Sheets

(51) Int. Cl.
*H04W 16/32* (2009.01)
*H04W 36/16* (2009.01)
*H04W 52/02* (2009.01)
*H04W 36/00* (2009.01)

(52) U.S. Cl.
CPC ...... *H04W 36/0069* (2018.08); *H04W 36/165* (2013.01); *H04W 52/0206* (2013.01)

(58) Field of Classification Search
CPC ... H04L 5/0057; H04L 5/0073; H04L 5/0094; H04L 5/001
See application file for complete search history.

(56) References Cited

U.S. PATENT DOCUMENTS

| | | | | |
|---|---|---|---|---|
| 10,244,445 | B2 * | 3/2019 | Cui | H04L 5/001 |
| 10,674,436 | B2 * | 6/2020 | Dinan | H04L 5/0057 |
| 10,721,720 | B2 * | 7/2020 | Damnjanovic | H04L 5/0032 |
| 10,791,512 | B2 * | 9/2020 | Kadiri | H04L 5/0098 |
| 2016/0255577 | A1 | 9/2016 | Kazmi et al. | |
| 2018/0049186 | A1 | 2/2018 | Hong et al. | |
| 2018/0103424 | A1 | 4/2018 | Kazmi et al. | |
| 2019/0274100 | A1 | 9/2019 | Kazmi et al. | |

OTHER PUBLICATIONS

Huawei et al., "Measurement Enhancement for fast SCell set-up", R2-1708546, 3GPP TSG-RAN WG2 Meeting #99, Berlin, German, Aug. 21-25, 2017.

Qualcomm Incorporated, "Fast SCell activation for enhanced CA utilization", R2-1710138, 3GPP TSG-RAN21 Meeting #99bis, Prague, Czech Republic, Oct. 9-13, 2017.

KT Corporation, "IDLE mode measurement reporting for fast SCell set-up", R2-1710901, 3GPP TSG-RAN WG2 199bis, Prague, Czech Republic, Oct. 9-13, 2017, pp. 1-2.

* cited by examiner

FIG.2

*RRCConnectionReconfiguration message*

```
SCellToAddMod-r10 ::=  SEQUENCE {
     sCellIndex-r10         SCellIndex-r10,
     ...
     sCellState-r15    ENUMERATED {activated, dormant}    OPTIONAL -- Need ON
}
```

FIG. 7

| Codepoint/Index | LCID value |
|---|---|
| 00000 | CCCH |
| 00001-01010 | Identity of the logical channel |
| 01011-01111 | Reserved |
| 10000 | Extended logical channel ID field |
| 10001 | Reserved |
| 10010 | Activation/Deactivation of PDCP Duplication |
| 10011 | Hibernation (1 octet) |
| 10100 | Hibernation (4 octets) |
| 10101 | Activation/Deactivation of CSI-RS |
| 10110 | Recommended bit rate |
| 10111 | SC-PTM Stop Indication |
| 11000 | Activation/Deactivation (4 octets) |
| 11001 | SC-MCCH, SC-MTCH (see note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

FIG.8

| Hibernation MAC control element $C_j$ | Activation/Deactivation MAC control element $C_i$ | SCell shall be |
|---|---|---|
| 0 | 0 | Deactivated |
| 0 | 1 | Activated |
| 1 | 0 | Reserved MAC control element combination |
| 1 | 1 | Dormant |

FIG.10

| Index | LCID values |
|---|---|
| 00000 | CCCH |
| 00001-01010 | Identity of the logical channel |
| 01011-10100 | Reserved |
| 10101 | Activation/Deactivation of CSI-RS |
| 10110 | Recommended bit rate |
| 10111 | SC-PTM Stop Indication |
| 11000 | Activation/Deactivation(4 octets) |
| 11001 | SC-MCCH, SC-MTCH(see note) |
| 11010 | Long DRX Command |
| 11011 | Activation/Deactivation(1 octets) |
| 11100 | UE Contention Resolution Identity |
| 11101 | Timing Advance Command |
| 11110 | DRX Command |
| 11111 | Padding |

*FIG.11*

| CS3 | CS2 | CS1 | Len |
|-----|-----|-----|-----|
| CS7 | CS6 | CS5 | CS4 |

| CS3 | CS2 | CS1 | Len |
|-----|-----|-----|-----|
| CS7 | CS6 | CS5 | CS4 |
| CS11 | CS12 | CS9 | CS8 |
| CS15 | CS14 | CS13 | CS12 |

. . .

FIG.13
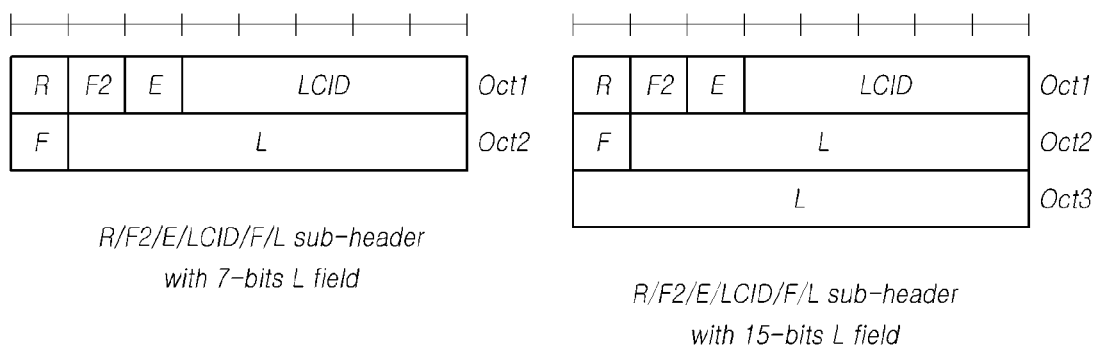
R/F2/E/LCID/F/L sub-header
with 7-bits L field
R/F2/E/LCID/F/L sub-header
with 15-bits L field
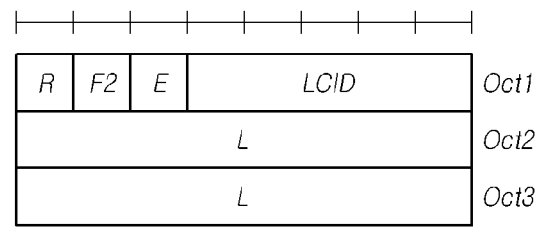
R/F2/E/LCID/F/L sub-header
with 16-bits L field
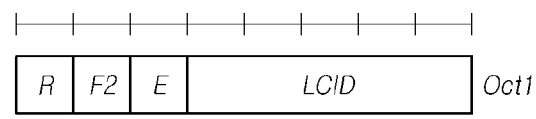
R/F2/E/LCID/F/L sub-header

FIG.14

| | Operations for timeline |
|---|---|
| Timeline for Activation | [n + 8]<br>– Start CSI reporting<br>– Start sCellDeactivation timer |
| | [n + m], 8 < m < 24 or 34<br>– Start PHR reporting<br>– Start valid CSI reporting<br>– Transmit SRS<br>– Start PDCCH monitoring |
| Timeline for Dormant | [n + 8]<br>– Start CSI reporting<br>– Start Dormant to activation(or Dormant activation to deactivation) timer |
| | [n + m], 8 < m < 24 or 34<br>– Start PHR reporting<br>– Start valid CSI reporting |
| Timeline for Deactivation | [n + m], 8 < m < 24 or 34<br>– Stop sCellDeactivation timer<br>– Flush HARQ buffers<br>– Stop SRS transmission<br>– Stop UL-SCH<br>– Stop RACH<br>– Stop PDCCH monitoring |
| | [n + 8]<br>– Stop CSI reporting |

METHOD AND APPARATUS FOR CONTROLLING SCELL STATE

CROSS REFERENCE TO RELATED APPLICATION

This application claims priority from Korean Patent Applications No. 10-2017-0178384, filed on Dec. 22, 2017, No. 10-2018-0027301, filed on Mar. 8, 2018, & No. 10-2018-0124177, filed on Oct. 18, 2018 which are hereby incorporated by reference for all purposes as if fully set forth herein.

BACKGROUND

1. Technical Field

The present disclosure relates to controlling and changing a state of a secondary cell.

2. Description of the Related Art

Studies on next generation mobile communication technologies have been in progress for satisfying demands for processing a large amount of data at a high-speed. For example, mobile communication systems have been employed technologies related to the 3rd generation partnership project (3GPP), such as Long Term Evolution (LTE), LTE-Advanced, 5G, for transmitting and receiving a large amount of various types of data, such as video data, radio data, at a high speed.

As another method for satisfying the demands, carrier aggregation has been introduced. Such carrier aggregation enables a user device (e.g., user equipment) and a base station to transmit and receive data by aggregating a plurality of carriers.

However, in order to transmit and receive data through the carrier aggregation, a user equipment and a base station are required to perform a complex procedure, such as, operations of the user equipment for measuring the quality of a target carrier and reporting the measured quality to a base station and operations of the base station for selecting one or more carriers and determining the carrier aggregation.

In addition, when a secondary cell configured through the carrier aggregation triggers state transition from a deactivation state into an activation state, a related user equipment and base station perform a complex procedure and causes a certain time delay in transmitting/receiving data using the secondary cell after the state transition has been performed into the activation state.

Such a time delay degrades service satisfaction from a user and a network perspective.

SUMMARY

To address such issues, the present disclosure is to provide a method and an apparatus for enabling a secondary cell to quickly perform state transition through a dormant state.

In addition, the present disclosure is to provide specific operations and procedures for controlling states for a secondary cell.

In accordance with an aspect of the present disclosure, a method of a user equipment is provided for controlling states of a secondary cell. The method includes receiving secondary cell (SCell) state indication information indicating a state for the SCell from a base station through an radio remote control (RRC) message or a medium access control (MAC) control element, causing a state of the SCell to transition into a dormant state when the SCell state indication information indicates the dormant state, and transmitting channel state information reporting for the SCell in the dormant state according to an dormant state CQI report period parameter set separately from an activation state CQI report period parameter.

In accordance with another aspect of the present disclosure, a method of a base station is provided for controlling states of a secondary cell of a user equipment. The method includes transmitting secondary cell (SCell) state indication information indicating a state for the SCell to the user equipment through an RRC message or a MAC control element, and when the SCell enters a dormant state according to the SCell state indication information, receiving channel state information reporting for the SCell in the dormant state according to an dormant state CQI report period parameter set separately from an activation state CQI report period parameter.

In accordance with another aspect of the present disclosure, a user equipment is provided for controlling states of a secondary cell. The user equipment includes a receiver configured to receive secondary cell (SCell) state indication information indicating a state for the SCell from a base station through a RRC message or a MAC control element, a controller configured to cause a state of the SCell to transition into a dormant state when the SCell state indication information indicates the dormant state, and a transmitter configured to transmit channel state information reporting for the SCell in the dormant state according to an dormant state CQI report period parameter set separately from an activation state CQI report period parameter.

In accordance with another aspect of the present disclosure, a base station is provided for controlling states of a secondary cell of a user equipment. The base station includes a transmitter configured to transmit secondary cell (SCell) state indication information indicating a state for the SCell to the user equipment through an RRC message or a MAC control element, and when the SCell enters a dormant state according to the SCell state indication information, a receiver configured to receive channel state information reporting for the SCell in the dormant state according to an dormant state CQI report period parameter set separately from an activation state CQI report period parameter.

In accordance with the present disclosure, it is possible to perform operations rapidly even when a state is transitioned into an activation state by defining a dormant state of a secondary cell configuring carrier aggregation.

In accordance with the present disclosure, it is also possible to eliminate the ambiguity of operations by defining methods and signals for changing a Scell' states including a dormant state.

BRIEF DESCRIPTION OF THE DRAWINGS

FIG. 2 is a diagram illustrating an RRC message including SCell state indication information according to at least one embodiment of the present disclosure.

FIG. 7 is a diagram illustrating examples of logical channel identifier (LCID) values according to at least one embodiment of the present disclosure.

FIG. 8 is a diagram illustrating operations for determining a state of a SCell in the case of receiving all MAC CEs different from each other according to at least one embodiment of the present disclosure.

FIG. 10 is a diagram illustrating a list of logical channel identifier (LCID) values for a DL-SCH according to an embodiment of the present disclosure.

FIG. 11 is a diagram illustrating a format of a MAC CE according to another embodiment of the present disclosure.

FIG. 13 is a diagram illustrating a format of a MAC subheader.

FIG. 14 is a diagram illustrating timing for receiving each of activation state indication information, dormant state indication information, and deactivation state indication information for a SCell according to at least one embodiment of the present disclosure.

DETAILED DESCRIPTION

Figure 1:
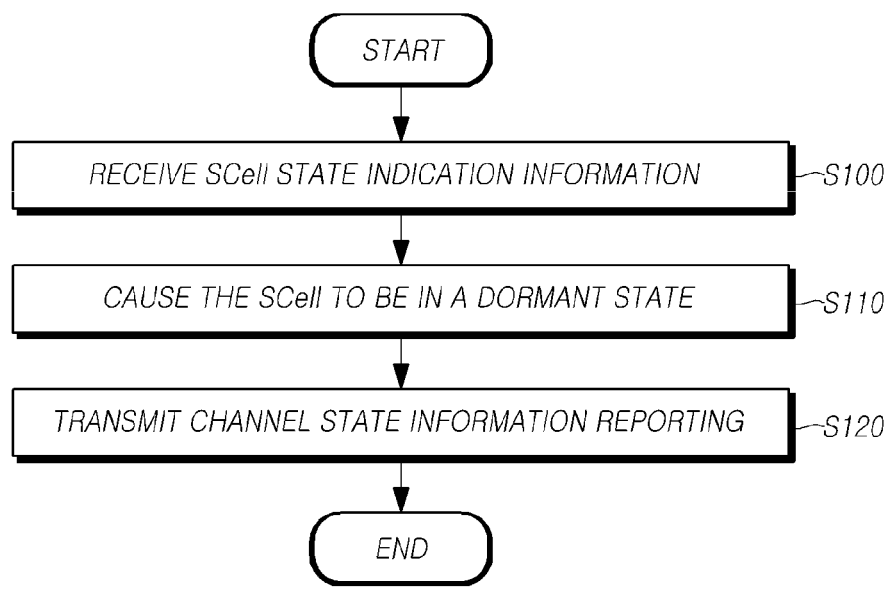
FIG. 1 is a flowchart illustrating operations of a user equipment according to at least one embodiment of the present disclosure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a wireless communication system refers to a system for providing various communication services such as a voice communication service, a packet data service, etc. The wireless communication system includes user equipment (UE) and a base station (BS).

The UE is defined as a generic term including devices used in wireless communication. For example, the UE may be referred to as a UE supporting wideband code division multiple access (WCDMA), long term evolution (LTE), high speed packet access (HSPA), international mobile telecommunications (IMT)-2020 (5G or new radio), and the like, a mobile station (MS) supporting the global system for mobile communication (GSM), a user terminal (UT), a subscriber station (SS), a wireless device, or the like. However, the embodiments of the present disclosure are not limited thereto.

The BS or a cell generally refers to a station communicating with the UE. The BS or cell is defined as a generic term including all of various coverage areas. For example, the BS or the cell may be referred to as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell. However, embodiments of the present disclosure are not limited thereto.

Since each of the various cells described above is controlled by a BS, the BS may be classified into two categories. 1) The BS may be referred to an apparatus that provides a megacell, a macrocell, a microcell, a picocell, a femtocell, and a small cell, in association with a radio area, or 2) the BS may be referred to a radio area itself. In case of 1), the BS may be referred to apparatuses providing a corresponding wireless service area by being controlled by the same entity or apparatuses providing a corresponding wireless service area by interacting and cooperating together. According to a method of establishing (e.g., providing, forming, configuring) a radio area (e.g., wireless service area), an example of the BS may be a point, a transmission/reception point, a transmission point, a reception point, or the like. In case of 2), the BS may be a radio area itself for receiving or transmitting a signal from a UE perspective or a neighboring BS perspective.

In the present disclosure, the cell may refer to a coverage of a signal transmitted from a transmission/reception point, a component carrier having the coverage of a signal transmitted from a transmission point or a transmission/reception point, or a transmission/reception point itself.

The UE and the BS are two entities for performing transmission/reception used to embody the technology and technical spirit described in the present disclosure. The UE and the BS are defined as a generic term and not limited to specific terms or words.

The uplink (UL) refers to a scheme for a UE to transmit data to or receive data from a BS, and the downlink (DL) refers to a scheme for a BS to transmit data to or receive data from a UE.

UL transmission and DL transmission may be performed by utilizing i) a time division duplex (TDD) technique performing transmission through different time slots, ii) a frequency division duplex (FDD) technique performing transmission through different frequencies, or iii) a hybrid technique of the frequency division duplex (FDD) and the time division duplex (TDD).

Further, a related standard of the wireless communication system defines to configure the UL and the DL based on a single carrier or a pair of carriers.

The UL and the DL transmit control information through one or more control channels, such as a physical DL control channel (PDCCH), a physical UL control channel (PUCCH), and the like. Further, the UL and the DL transmit data through one or more data channels, such as a physical DL shared channel (PDSCH), a physical UL shared channel (PUSCH), and the like.

The DL may denote communication or a communication path from multiple transmission/reception points to a UE, or the UL may denote communication or a communication path from the UE to the multiple transmission/reception points. In the DL, a transmitter may be a part of multiple transmission/reception points, and a receiver may be a part of the UE.

In the UL, a transmitter may be a part of the UE and a receiver may be a part of multiple transmission/reception points.

Hereinafter, transmission and reception of a signal through a channel such as the PUCCH, the PUSCH, the PDCCH, or the PDSCH, may be described as the transmission and reception of the channel, such as the PUCCH, the PUSCH, the PDCCH, or the PDSCH.

Meanwhile, higher layer signaling described below includes radio resource control (RRC) signaling that transmits RRC information containing an RRC parameter.

The BS performs DL transmission to USs. The BS may transmit a physical DL control channel for transmitting □) DL control information, such as scheduling required to receive a DL data channel that is a primary physical channel for unicast transmission, and □) scheduling approval information for transmission through an UL data channel. Hereinafter, transmission/reception of a signal through each channel will be described as transmission/reception of the corresponding channel.

Any of multiple access techniques may be applied to the wireless communication system, and therefore no limitation is imposed on them. For example, such multiple access techniques may include time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

At least one embodiment of the present disclosure may be apply to resource allocation in i) asynchronous wireless communication evolving into LTE/LTE-advanced and IMT-2020 from GSM, WCDMA, and HSPA, and ii) synchronous wireless communication evolving into CDMA, CDMA-2000, and UMB.

In the present disclosure, a machine type communication (MTC) device may refer to a device supporting low cost (or low complexity), a device supporting coverage enhancement, or the like. As another example, the MTC device of the present disclosure may refer to a device defined as a predetermined category for supporting low cost (or low complexity) and/or coverage enhancement.

In other words, the MTC device may refer to a low cost (or low complexity) UE category/type newly defined in 3GPP Release-13 and performing LTE-based MTC-related operations. As another example, the MTC device may refer to a UE category/type defined in or before 3GPP Release-12, which supports enhanced coverage in comparison with the typical LTE coverage or supports low power consumption, or may refer to a low cost (or low complexity) UE category/type newly defined in Release-13. The MTC device may refer to a further enhanced MTC device defined in Release-14.

In the present disclosure, a narrowband Internet of Things (NB-IoT) device refers to a device supporting radio access for cellular IoT. NB-IoT technology aims at improved indoor coverage, support for large-scale low-speed devices, low latency sensitivity, very low device costs, low power consumption, and optimized network architecture.

An enhanced mobile broadband (eMBB), massive machine-type communication (mMTC), and ultra-reliable and low latency communication (URLLC) are proposed as representative usage scenarios for NR.

A frequency, a frame, a subframe, a resource, a resource block (RB), a region, a band, a sub-band, a control channel, a data channel, a synchronization signal, various reference signals, various signals, and various messages associated with NR of the present disclosure may be interpreted as being used in the past or present or as various meanings to be used in the future.

Hereinafter, a method and an apparatus for controlling carrier aggregation and a state of a secondary cell in accordance with embodiments of the present disclosure will be described in detail.

In the present disclosure, a secondary cell denotes a cell providing an additional radio resource other than a primary cell (PCell) serving as a reference for RRC connection when a UE configures carrier aggregation. The secondary cell may be described as SCell, but the term is not limited thereto. In addition, in the present disclosure, description or embodiments related to state changes of the SCell apply to a normal cell providing an additional radio resource, and may not apply to the PSCell, or a special cell.

In the present disclosure, an activation state denotes a state capable of transmitting/receiving data by performing operations of a normal SCell. A deactivation state denotes a state in which a SCell is configured on a UE, but a transmission or reception operation, or the like is not performed for the SCell. A dormant state is a state newly defined in accordance with at least one embodiment. The dormant state denotes a state in which at least one operation in the activation state and at least one operation in the deactivation state are mixed. The dormant state may be replaced by an arbitrary term, such as a fast activation state, mid activation state, low power activation state, high power deactivation state, new SCell state, mid power SCell state, mid state, mid activated state, semi activated state, semi deactivated state, or the like. Terms on states described above are just examples, and not limited thereto.

In the present disclosure, channel state information reporting includes information on channels measured, estimated or calculated by a UE and is described as CSI reporting, CQI reporting, or the like. This is for convenience of description. The channel state information reporting denotes reporting including at least one of CQI, PMI, RI, PTI and CRI. In addition, hereafter, if necessary, the channel state information reporting may be discussed using CSI reporting or CQI reporting, and should be construed as meaning including all of the channel state information described above except for a particular situation.

Carrier aggregation (CA) technology is a technique for boosting a data transmission rate for a UE through an additional carrier. Typical CA technology has not been optimized for the configuration of a SCell and an activation state for the SCell from latency perspective.

For example, a BS instructs a UE in an RRC connected state to perform a measurement configuration on a frequency of a candidate cell, which may be configured as a SCell on the UE, before configuring the CA. If the UE transmits a measurement report to the BS according to a reporting configuration, the BS additionally configures a SCell on the UE based on the received measurement report. When the SCell is configured on the UE, the SCell is configured to be in the deactivation state.

Thereafter, the BS may transmit user data by activating the SCell considering another measurement report, an amount of transmitted/received data, and the like for the corresponding cell.

If the SCell is in the deactivation state, the UE does not i) transmit SRS on the SCell, ii) transmit on UL-SCH on the SCell, iii) transmit on RACH on the SCell, □) perform a channel quality indicator (CQI)/precoding matrix indicator (PMI)/rank indicator (RI)/procedure transaction identifier (PTI)/CSI-RS resource indicator (CRI) report for the SCell, ☐) monitor the PDCCH on the SCell, and ☐) perform PDCCH monitoring for the SCell.

If the SCell enters the activation state, normal operations of the SCell are performed. For example, a SCell in the activation state may perform operations, such as, SRS transmission, CQI/PMI/RI/PTI/CRI reporting for the SCell, PDCCH monitoring, PUCCH transmission, or the like.

A MAC control element (MAC CE) is used to transition a typical SCell to the activation state. When receiving the MAC CE for activating a SCell in a subframe n, the UE shall be capable of applying SCell activation operations up to n+24 or n+34 subframes. Related timing specifications are as follows.

When a UE receives an activation command for a SCell in subframe n, the corresponding actions in 3GPP TS 36.321 shall be applied no later than the minimum requirement defined in [36.133] and no earlier than subframe n+8, except for the following:

the actions related to CSI reporting on a serving cell which is active in subframe n+8 the actions related to the sCellDeactivationTimer associated with the secondary cell These two operations shall be applied in subframe n+8.

the actions related to CSI reporting on a serving cell which is not active in subframe n+8

This operation shall be applied in the earliest subframe after n+8 in which the serving cell is active.

The minimum requirements defined in the relevant 3GPP TS36.133 are as follows.

In the case of SCell activation latency requirement, upon receiving SCell activation command in subframe n, the UE shall be capable of transmitting valid CSI report and applying actions related to the activation command as specified for the SCell being activated no later than in subframe n+24 provided the following conditions are met for the SCell:

During the period equal to max (5 measCycleSCell, 5 DRX cycles) before the reception of the SCell activation command:

the UE has sent a valid measurement report for the SCell being activated and the SCell being activated remains detectable according to the cell identification conditions specified in section 8.3.3.2, SCell being activated also remains detectable during the SCell activation delay according to the cell identification conditions specified in section 8.3.3.2.

Otherwise upon receiving the SCell activation command in subframe n, the UE shall be capable of transmitting valid CSI report and applying actions related to the activation command for the SCell being activated no later than in subframe n+34 provided the SCell can be successfully detected on the first attempt.

Thus, a considerable delay occurs until the UE becomes able to transmit data through a SCell after having received a MAC CE indicating SCell activation. That is, about 24 to 34 ms is consumed for performing effective data scheduling based on valid CQI reporting.

When a SCell in the deactivation state enters the activation state, a UE performs RF retuning, initial CQI measuring and CQI reporting. A method of reducing time for estimating and reporting initial valid CQI may be considered as one of methods for rapidly transitioning a SCell to the activation state. This method can be realized by the UE's measuring or reporting periodically the CQI for a configured SCell. However, the periodical measurement or report of the CQI causes a problem of consuming power. As another method, a new state may be defined for interrupting or not performing one or more of operations in the activation state, which cause power consumption. Using such a new state, the state of the SCell can be rapidly transited to the activation state to transmit data in the activation state. In case of defining the new state of the SCell, it may require to perform additional operation, such as, transition between the new SCell state and the typical activation state, and transition between the new SCell state and the typical deactivation state, and the like.

The present disclosure proposes such a new state as the dormant state and operations of a UE and a BS for transiting SCell states in accordance with at least one embodiment.

As described above, in the typical CA technology, a considerable delay occurs until the UE becomes able to transmit user data through a cell additionally configured with carrier aggregation, after the UE in an idle state has transitioned into an RRC connected state and configured the carrier aggregation. In particular, a considerable delay occurs until the UE becomes able to transmit data through a SCell after having received a MAC CE indicating SCell activation. Such delay may be shortened by reducing time for estimating and/or reporting an initial valid CQI. However, no specific method has been proposed for reducing the time of estimating and reporting. Further, such a method may also have a problem of consuming power. As another method, a new state may be defined for controlling a SCell to not perform or interrupt activation state operations causing power consumption. Using such a new state, it is possible to rapidly transition a state of the SCell to the activation state to transmit data in the activation state. However, no specific method for defining a new state and controlling SCell based on the new state has not been proposed.

The present disclosure provides a method and an apparatus for reducing delay occurring until the UE becomes able to transmit data through a SCell after having received a MAC CE indicating SCell activation. In addition, the present disclosure introduces a SCell state, the dormant state, and a method for i) transitioning into the activation state to transmit data or ii) transitioning into the deactivation state.

Meanwhile, for better understanding, hereinafter, at least one embodiment of the present disclosure will be described based on the LTE radio access technology. However, description or at least one embodiment discussed below may be applied to a fifth generation new radio (5G NR) or other radio access technologies as well as the LTE radio access technology. Hereinafter, description on well-known techniques will be omitted. The omitted description or some information elements shall refer to information elements specified in the RRC standard TS 36.331. In addition, with respect to operations of a UE, some operations include operations specified in the MAC standard TS 36.321. Even though description on operations of a UE related to the definitions of corresponding information elements is not included in this disclosure, the corresponding description may be included in the present disclosure or incorporated into claims.

FIG. 1 is a flowchart illustrating operations of a UE according to at least one embodiment of the present disclosure.

Referring to FIG. 1, a UE controlling a state of a secondary cell (SCell) (e.g., SCell state) may perform operations for receiving SCell state indication information from a BS through an RRC message or a MAC CE (S100). The SCell state indication information may indicate the state of the SCell.

For example, the UE may receive SCell state indication information through higher layer signaling or a MAC CE. The higher layer signaling may denote an RRC message. The higher layer signaling and the MAC CE may be received depending on a situation such as whether the UE configures a SCell.

In one example, the SCell state indication information may be included in an RRC connection reconfiguration message that the UE receives for configuring a SCell. For example, the SCell state indication information received through the RRC message may include a 1 bit parameter indicating one of the activation state and the dormant state. If configuration information for configuring the SCell is contained in the RRC message, but a parameter for the SCell state indication information is not contained in the configuration information, the UE may configure the SCell to be in the deactivation state. Thereafter, the UE may control a state of the SCell according to SCell state indication information received through the MAC CE.

As another example, after having configured the SCell, the UE may dynamically receive state indication information for the SCell through the SCell state indication information by the MAC CE. For example, the MAC CE including the SCell state indication information may have a format including a field for indicating a state for the SCell as the activation state or the dormant state for each SCell index. As another example, the MAC CE including the SCell state indication information may be formed in a format including a field for indicating a state for the SCell as the activation state or the deactivation state for each SCell index.

In other words, the MAC CE may be divided into i) a first MAC CE configured to indicate a state for each SCell index as the activation state or the deactivation state and ii) a second MAC CE configured to indicate a state for each SCell index as the dormant state or the activation state. In this case, the first MAC CE and the second MAC CE are identified by one or more MAC PDU subheaders having logical channel IDs (LCID) different from each other. For example, the first MAC CE may be identified by a MAC PDU subheader having an activation or deactivation LCID value. The second MAC CE may be identified by a MAC PDU subheader having a hibernation LCID value. Thus, the first MAC CE and the second MAC CE are arbitrary terms for dividing the MAC CE, and not limited thereto. That is, the first MAC CE may be described as an activation/deactivation MAC CE, and the second MAC CE may be described as a hibernation MAC CE.

Operations for receiving and processing messages according to each situation will be described in detail below with reference to the drawings.

Meanwhile, when the SCell state indication information indicates the dormant state, the UE may perform controlling a state of the SCell into the dormant state (S120).

For example, the UE checks whether SCell state indication information is contained in the RRC message or the MAC CE and controls states of the SCell according to the SCell state indication information. In an example, when the SCell state indication information indicates the dormant state, the UE may configure a state of the SCell to be in the dormant state, or cause the state of the SCell to transition into the dormant state.

For example, when an RRC message for configuring the SCell on the UE is received and SCell state indication information is contained in the RRC message, the UE may configure the SCell to be in a state indicated by the SCell state indication information. That is, when configuring the SCell on the UE, the UE may configure the SCell to be in the activation state or in the dormant state according to the SCell state indication information (e.g., the UE may perform operations for changing a state of the SCell to the activation state or the dormant state). If the SCell state indication information is not contained in the RRC message for configuring the SCell, the UE may configure the SCell to be in the deactivation state (e.g., the UE may perform operations for changing the state of the SCell to the deactivate state).

As another example, the UE may receive a MAC CE indicating a state for the configured SCell. For example, a MAC CE including the SCell state indication information may include a field for indicating a state for the SCell as the activation state or the dormant state for each SCell index.

Specifically, if a value of an index field for the SCell is set to a value indicating the activation state and if a state for the SCell indicated by the index is the dormant state, the UE may perform operations for changing a state of the SCell into the activation state.

As another example, when a value of an index field of the SCell is set to a value indicating the activation state and when a state for the SCell is not the dormant state, the UE may ignore the index field value. That is, the current state of the SCell may be remained.

As another example, as described above, there may be two types of MAC CEs: a first MAC CE and a second MAC CE. The first MAC CE is configured to indicate a state for the SCell as the activation or deactivation state, and the UE may control a state of the SCell according to the corresponding indication information. The second MAC CE is configured to indicate a state for the SCell as the activation or dormant state, and the UE may control a state of the SCell according to a value of an index field described above and the current state of the corresponding SCell.

In addition, it is necessary for the UE to assume receipt of all of the first MAC CE and the second MAC CE. In this case, the UE may determine a state of the corresponding SCell by combining values of SCell index fields indicated by the two MAC CEs. For example, it is possible for the UE to determine whether SCell state indication information indicates the dormant state by combining values of index fields for the SCell included in each of the first MAC CE and the second MAC CE.

Meanwhile, the UE may perform operations for transmitting channel state information reporting for the SCell in the dormant state according to a dormant state CQI report period parameter set separately from an activation state CQI report period parameter (S130).

For example, if the SCell is in the dormant state, the UE may report channel state information for the SCell. Specifically, the UE may report CQI/PMI/RI/PTI/CRI for the SCell in the dormant state. In this case, the UE does not transmit SRS on the SCell in the dormant state. In addition, the UE does not transmit UL-SCH and RACH on the SCell in the dormant state. In addition, the UE does not monitor PDCCH on the SCell in the dormant state. The UE does not monitor the PDCCH for the SCell in the dormant state. The UE does not also transmit PUCCH on the SCell in the dormant state.

As described above, when a SCell is controlled to be in the dormant state or transited into the dormant state, the UE reports channel state information for the corresponding SCell to a BS, but does not perform the other operations in the same manner as the deactivation state. Thus, the dormant state is similar to the deactivation state in performing some of operations in the activation state.

The UE may use a CQI report period parameter(s) for channel state information reporting for the SCell in the dormant state. For example, the UE reports channel state information to a BS at a period set based on the CQI report period parameter(s). In this case, the CQI report period parameter(s) for transmitting channel state information for a SCell in the dormant state is distinguished from a CQI report period parameter(s) for transmitting channel state information for a SCell in the activation state. That is, the UE receives the activation state CQI report period parameter(s) and the dormant state CQI report period parameter(s), and periodically transmits channel state information by applying one of the period parameters according to a state of the SCell.

In accordance with the above-described embodiments of the present disclosure, the UE may control a state of a SCell to the dormant state, the activation state, or the deactivation state. Since the UE transmits channel state information for a SCell in the dormant state to a BS, the UE may reduce delay time when causing the SCell to transition into the activation state to use the SCell.

Hereinafter, operations of the UE are described in more detail with reference to the accompanying drawings.

FIG. 2 is a diagram illustrating an RRC message including SCell state indication information according to at least one embodiment of the present disclosure.

Referring to FIG. 2, the UE may receive an RRC connection reconfiguration message including configuration information that indicates a configuration of a SCell. In this case, SCell state indication information may be contained in the SCell configuration information as its one parameter. For example, the SCell state indication information may be composed of a 1 bit parameter for indicating a state for a SCell configured or to be configured additionally as one of the activation state and the dormant state.

Through this, the UE may set an initial state for a SCell to be configured by checking SCell state indication information (e.g., sCellState-r15). The operations thereof will be described below with reference to FIG. 3.

Figure 3:
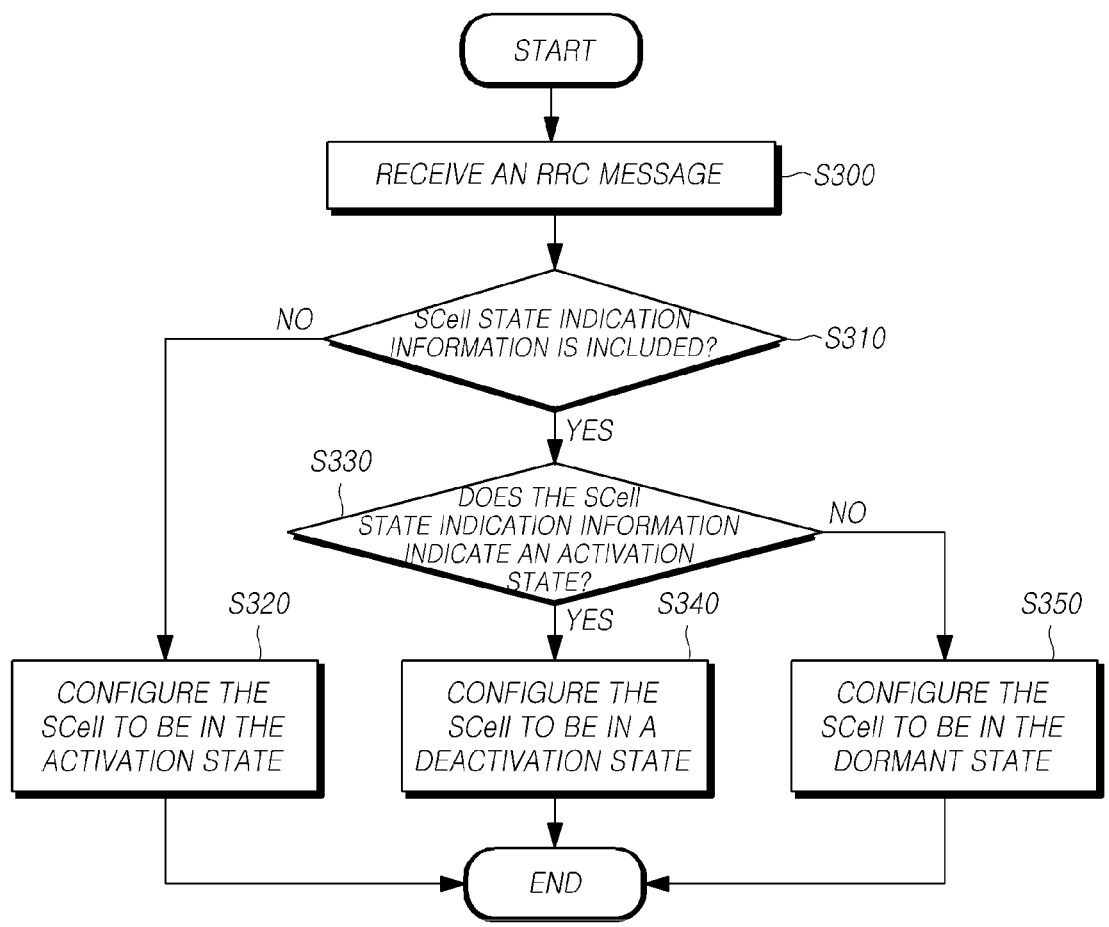
FIG. 3 is a flowchart illustrating operations for controlling a state of a SCell through an RRC message according to at least one embodiment of the present disclosure.

FIG. 3 is a flowchart illustrating operations for controlling a state of a SCell through an RRC message according to at least one embodiment of the present disclosure.

Referring to FIG. 3, a UE receives an RRC message for adding or configuring a SCell from a BS (S300). For example, the BS or the corresponding network may instruct a configured SCell to be in or to transition into the dormant state. To do this, the network (BS) may use the RRC message.

For example, the SCell may be controlled to be in the deactivation state when the SCell is added/configured or in an initial stage after a handover has been performed. As another example, the UE may receive an RRC connection reconfiguration message containing SCell state indication information indicating the activation state for the SCell from the BS, to enable the UE to transmit user data rapidly through the configured SCell. In this case, the UE may set the corresponding SCell to be in the activation state when the SCell is added/configured or in an initial stage after a handover has been performed. As further another example, the UE may receive an RRC connection reconfiguration message containing information indicating the dormant state for the SCell from the BS, to enable the configured SCell to transition into the SCell activation state rapidly. In this case, the UE may configure the corresponding SCell to be in the dormant state when the SCell is added/configured or in an initial stage after a handover has been performed.

For the above operations, when the UE receives an RRC message, the UE determines whether the RRC message includes SCell state indication information (S310).

For example, the SCell state indication information may be contained in common SCell configuration information (e.g., commonSCellconfig) applied to a specific group of SCells, as its one information element. Thus, the SCell state indication information may be applied to the specific SCell group. As another example, the SCell state indication information may contained in SCell configuration information (e.g., SCellToAddMod) applied to individual SCells, as its one information element. Thus, the SCell state indication information may be applied to a specific SCell.

Meanwhile, the SCell state indication information may be made of 2 bits and represent a value of one of the dormant state, the activation state, and the deactivation state for a corresponding SCell. If the SCell state indication information is made of 2 bits, it is possible to use one value as a spare value. For example, the SCell state indication information may be composed of SCellstate ENUMERATE {activate, deactivate, dormant, spare}.

As another example, the SCell state indication information may be made of 1 bit and represent a value indicating one of the dormant state and the activation state for a corresponding SCell. For example, the SCell state indication information may include SCellstate ENUMERATE {activate, dormant} or SCellstate ENUMERATE {TRUE(activate), FALSE(dormant)}. In this case, the corresponding information element (e.g. SCellstate) may be set as an optional information element. Accordingly, when the SCell state indication information is not contained in the SCell configuration information, the SCell may be controlled to be in the deactivation state when the SCell is added/configured or in an initial stage after a handover has been performed, as in the typical system (S320).

When the SCell state indication information is contained, the UE may determine whether the SCell state indication information indicates the activation state (S330). When the SCell state indication information is set to a value indicating the activation state, the UE controls the corresponding SCell to be in the activation state (S340).

Meanwhile, when the SCell state indication information is not set to a value indicating the activation state, that is, set to a value indicating the dormant state, the UE controls the corresponding SCell to be in the dormant state (S350).

For example, when an RRC message containing information indicating the dormant state for a SCell is received, the UE does not transmit SRS on the SCell. In addition, the UE does not transmit information through UL-SCH on the corresponding SCell. In addition, the UE does not transmit information through RACH on the corresponding SCell. In addition, the UE does not monitor PDCCH on the corresponding SCell. In addition, the UE does not transmit PUCCH on the corresponding SCell. If an SCell deactivation timer (sCellDeactivationTimer) associated with the corresponding SCell is in operation, the UE stops/interrupts the Scell deactivation timer. In addition, the UE flushes all HARQ buffers associated with the corresponding SCell. In addition, the UE stops/interrupts a SCell deactivation timer (sCellDeactivationTimer) associated with the corresponding SCell and flushes all HARQ buffers associated with the corresponding SCell.

However, the UE may transmit channel state information for the corresponding SCell in accordance with a period indicated by a periodic CQI reporting configuration (e.g., period information, CQI PUCCH resource information, CQI format indication information, or one or more pieces of parameter information capable of calculating period information) in the dormant state. The channel state information contains CQI/PMI/RI/PTI/CRI.

Thus, when configuring a SCell, the UE may determine a state of the SCell configured or to be configured based on SCell state indication information and control the states of the SCell.

Meanwhile, the UE may change a state of the configured SCell based on a MAC CE received from a BS.

Figure 4:
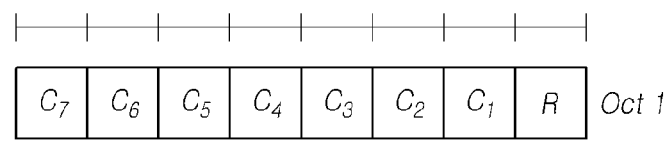
FIG. 4 is a diagram illustrating a format of a MAC control element (MAC CE) according to one embodiment of the present disclosure.
Figure 5:
FIG. 5 is a diagram illustrating a format of a MAC CE according to another embodiment of the present disclosure.

FIG. 4 is a diagram illustrating a format of a MAC control element (MAC CE) according to one embodiment of the present disclosure. FIG. 5 is a diagram illustrating a format of a MAC CE according to another embodiment of the present disclosure.

Referring to FIGS. 4 and 5, MAC control elements (MAC CE) may have a format including fields for indicating a state for the SCell as the activation state or the dormant state for each SCell index.

Each format includes a reserve bit (R) and bits (Ci) separated by an index of each cell. For example up to 7 SCell indexes may be indicated as shown in FIG. 4. As another example, up to 31 SCell indexes may be indicated as shown in FIG. 5. Specifically, the MAC CE having one octet is identified by a MAC PDU subheader. The MAC CE has a fixed size and includes a single octet containing 7 C fields and one R field. The MAC CE having four octets is identified by a MAC PDU subheader. The MAC CE has a fixed size and includes four octets containing 31 C fields and one R field.

The UE may check an index of the corresponding SCell, check a bit value of the corresponding index, and then determine whether to transition a state of the SCell.

For example, if a value of an index field for the SCell is set to a value indicating the activation state and if a state of the SCell is the dormant state, the UE may transition the state of the SCell to the activation state.

As another example, when a value of an index field of the SCell is set to a value indicating the activation state and when a state of the SCell is not the dormant state, the UE may ignore the index field value and maintain a state at the time of receiving the MAC CE.

Figure 6:
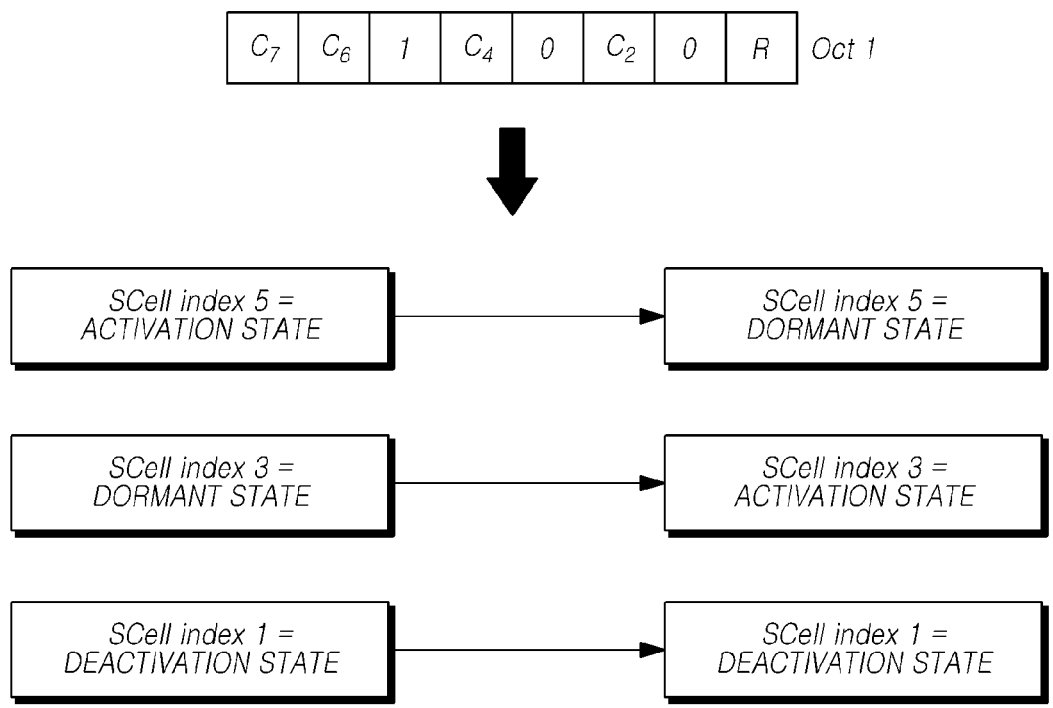
FIG. 6 is a diagram for describing a procedure of changing a state of a SCell according to a MAC CE including SCell state indication information according to at least one embodiment of the present disclosure.

FIG. 6 is a diagram illustrating a procedure of changing a state of a SCell according to a MAC CE including SCell state indication information according to at least one embodiment of the present disclosure.

Referring to FIG. 6, a MAC CE having one octet is applied when a serving cell index (ServCellIndex) is not greater than 8. Otherwise, a MAC CE having 4 octets is applied. Each SCell is assigned with a SCell index (SCellIndex) i and "i" denotes an index of a corresponding Scell. That is, in a MAC CE, a Ci field indicates a state of a SCell having a SCellIndex i. Otherwise, the MAC entity shall ignore the Ci field.

As shown in FIG. 6, the fields $C_1$, $C_3$, and $C_5$ are exemplarily illustrated as having a value 0 or 1. It shows that i) a SCell having a SCell index 1 ($C_1$) is in the deactivation state, ii) a SCell having a SCell index 3 (C3) is in the dormant state, and iii) a SCell having a SCell index 5 (C5) is in the activation state, at the time of receiving the MAC CE.

The Ci field is set to 1 to indicate that a SCell having the SCellIndex i is required to transition to the dormant state. The Ci field is set to 0 to indicate that a SCell having the SCellIndex i is required to be activated. The R field is set to 0 as a reserved bit.

When receiving a MAC CE, the UE determines state transition using i) the current state of a SCell having the corresponding SCell index and ii) an indication value indicated by the MAC CE.

For example, when a value of an index field of a SCell is set to a value indicating the activation state (ex, "0"), and when a current state of the SCell is the dormant state, the UE may transition the state of the SCell to the activation state. That is, since $C_3$ is set to 0, the UE transitions the SCell having SCell index 3 in the dormant state to the activation state.

As another example, when a value of an index field of a SCell is set to a value indicating the activation state (ex, "0") and when a current state of the SCell is not the dormant state, the UE ignores the index field value. That is, even though C1 is set to 0, since the SCell having SCell index 1 is not in the dormant state, the UE remains the corresponding SCell in the deactivation state.

As another example, when a value of an index field of a SCell is set to a value indicating the dormant state (ex, "1"), the UE transitions the state of the SCell to the dormant state. That is, since C5 is set to 1, the UE transitions the SCell having SCell index 5 to the dormant state.

In this way, the UE controls a state for the SCell based on the MAC CE including information indicating as either the activation state or the dormant state.

As described, the MAC CE may be divided into i) a MAC CE including fields indicating one of the activation state and the dormant state and ii) a MAC CE including fields indicating one of the activation state and the deactivation state.

FIG. 7 is a diagram illustrating examples of logical channel identifier (LCID) values according to at least one embodiment of the present disclosure.

Referring to FIG. 7, a MAC CE may be divided into i) a first MAC CE set to indicate a state for each SCell as one of the activation state and the deactivation state and i) a second MAC CE set to indicate a state for each SCell as one of the dormant state and the activation state. The first MAC CE and the second MAC CE may be identified by MAC PDU subheaders having logical channel IDs (LCIDs) different from each other.

For example, a MAC PDU subheader having an LCID value of 11000 or 11011 may indicate a MAC CE for indicating a state of a SCell as the activation or deactivation state. A MAC PDU subheader having an LCID value of 10011 or 10100 may indicate a MAC CE for indicating a state of a SCell as the activation or the dormant state. In this way, each of the first MAC CE and the second MAC CE is identified by MAC PDU subheaders having LCIDs different from each other. Also, each of the first MAC CE and the second MAC CE may be identified by different LCID values from each other according to MAC CE octet(s).

As described above, a MAC CE may indicate two states of a SCell, without using the octet value. For example, a MAC CE may indicate the activation state or the deactivation state.

Such a MAC CE for indicating two states (e.g., the activation state or the deactivation state) may have field formats shown in FIGS. 4 and 5 according to the octet(s). In this case, as described above, the MAC CE is divided according to values of MAC PDU subheader. For example, the activation/deactivation MAC CE having one octet is applied when a serving cell index (ServCellIndex) is not greater than 8. Otherwise, the activation/deactivation MAC CE having four octets is applied. A SCell is assigned with a SCell index ($C_i$), where "i" denotes an index of a corresponding SCell. A Ci field indicates the activation/deactivation state of a SCell having a SCellIndex i ($C_i$). Otherwise, the MAC entity shall ignore the $C_i$ field. The Ci field is set to 1 to indicate that a corresponding SCell is required to be activated. The Ci field is set to 0 to indicate that a corresponding SCell is required to be deactivated. The R field is set to 0 as a reserved bit.

Therefore, it is required to assume that the UE receives both of i) a MAC CE indicating the activation state or the deactivation state and ii) a MAC CE indicating the activation state or the dormant state. When a single MAC CE is received, the UE identifies it based on a subheader of a MAC PDU including the MAC CE and determines whether to trigger state transition according to the field value and a state of the corresponding SCell. However, when two MAC CEs are received, a rule is needed for confirming state transition instruction for the SCell.

FIG. 8 is a diagram illustrating operations for determining a state of a SCell when a UE receives both of first and second MAC CEs according to at least one embodiment of the present disclosure.

When the UE receives both the first MAC CE and the second MAC CE, the UE determines a value indicated by SCell state indication information based on the combination of index field values for the SCell included in each of the first MAC CE and the second MAC CE.

Referring to FIG. 8, the hibernation MAC control element (CE) is a second CE that indicates one of the activation state and the dormant state, and the Activation/Deactivation MAC CE is a first CE that indicates one of the activation state and the deactivation state.

The values of the individual SCell index fields in each MAC CE may be set to 0 or 1. In this case, a state of the corresponding SCell may be transitioned to the deactivation, activation or dormant state, depending on the combination of a specific SCell index field value set in each MAC CE, as shown in FIG. 8.

For example, when the field value for a specific SCell index of the second CE is 0, and the field value for the same specific SCell index of the first CE is 0, then the corresponding SCell shall be controlled to be in the deactivation state. Likewise, when the field value of the second CE is 0 and the field value of the first CE is 1, the corresponding SCell shall be caused to be in the activation state. In addition, when the field value of the second CE is 1 and the field value of the first CE is 1, the corresponding SCell shall be caused to be in the dormant state. A state where the field value of the second CE is 1 and the field value of the first CE is 0 has been reserved and may be utilized in future.

Meanwhile, when it is determined that a state for a specific SCell is the activation state, the UE's MAC entity does not transmit SRS on the corresponding SCell.

The UE reports CQI/PMI/RI/PTI/CRI for the corresponding SCell in accordance with a period indicated by a periodic CQI reporting configuration (e.g., period information, CQI PUCCH resource information, CQI format indication information, or one or more pieces of parameter information capable of calculating period information) in the dormant state. In addition, the UE does not transmit information through UL-SCH on the corresponding SCell. In addition, the UE does not transmit information through RACH on the corresponding SCell. In addition, the UE does not monitor PDCCH on the corresponding SCell. In addition, the UE does not transmit PUCCH on the corresponding SCell.

If a SCell deactivation timer (sCellDeactivationTimer) associated with the corresponding SCell is in operation, the UE stops/interrupts it. The UE flushes all HARQ buffers associated with the corresponding SCell. As another example, the UE stops/interrupts the SCell deactivation timer (sCellDeactivationTimer) associated with the SCell when the SCell transitions from the activation state to the dormant state. The UE flushes all HARQ buffers associated with the corresponding SCell.

Figure 9:
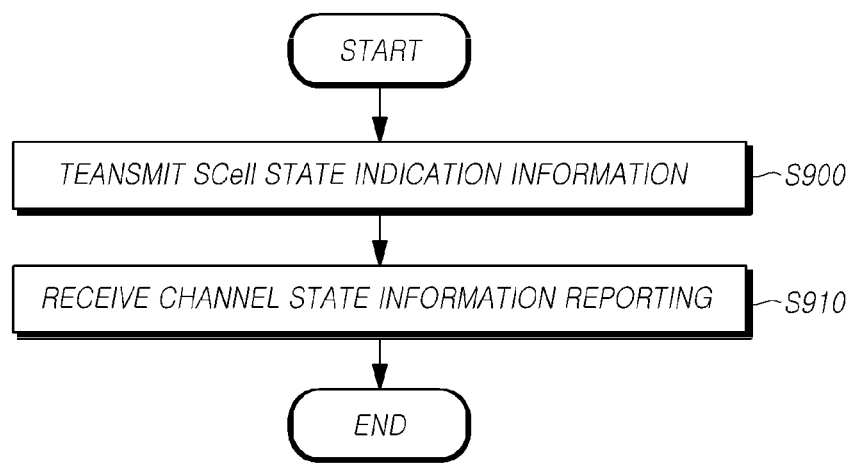
FIG. 9 is a flowchart illustrating operations of a base station according to at least one embodiment of the present disclosure.

FIG. 9 is a flowchart illustrating operations of a base station according to at least one embodiment of the present disclosure.

Referring to FIG. 9, a BS controlling a state for a secondary cell (SCell) of a UE may perform operations transmitting SCell state indication information indicating a state for the SCell through an RRC message or a MAC CE (S900).

For example, the BS may transmit the SCell state indication information through higher layer signaling or a MAC CE. The higher layer signaling may denote an RRC message. The higher layer signaling and the MAC CE may be transmitted depending on a situation such as whether the UE configures a SCell.

For example, the SCell state indication information may be contained in an RRC connection reconfiguration message when the BS transmits the RRC connection reconfiguration message for configuring a SCell of the UE. For example, the SCell state indication information transmitted through the RRC message may include 1 bit parameter indicating the activation state or the dormant state. If configuration information for configuring the SCell is contained in the RRC message, but a parameter for the SCell state indication information is not contained in the configuration information, the UE may configure the SCell to be in the deactivation state. Thereafter, the BS may control a state for the SCell according to SCell state indication information transmitted through the MAC CE.

As another example, after the UE has configured the SCell, the BS may dynamically transmit SCell state indication information through the MAC CE. For example, the MAC CE including the SCell state indication information may be configured in a format including a field for indicating a state for the SCell as the activation state or the dormant state for each SCell index. As another example, the MAC CE including the SCell state indication information may have a format including a field indicating a state for the SCell as the activation state or the deactivation state for each SCell index.

In other words, the MAC CE may be divided into a first MAC CE set to indicate a state for each SCell index as the activation state or the deactivation state and a second MAC CE set to indicate a state for each SCell index as the dormant state or the activation state. In this case, the first MAC CE and the second MAC CE are identified by MAC PDU subheaders having logical channel IDs (LCID) different from each other.

When the SCell is controlled to be in the dormant state according to the SCell state indication information, the BS performs operations for receiving channel state information reporting for the SCell in the dormant state according to a dormant state CQI report period parameter set separately from a activation state CQI report period parameter (S910).

For example, if the SCell of the UE is in the dormant state, the BS may receive channel state information for the SCell. Specifically, the BS may receive CQI/PMI/RI/PTI/CRI for the SCell in the dormant state. However, as described above, the BS does not receive the SRS on the SCell in the dormant state. In addition, the BS does not receive UL-SCH on the SCell in the dormant state. In addition, the BS does not transmit PDCCH on the SCell in the dormant state. The BS does not transmit the PDCCH for the SCell in the dormant state. The BS does not also perform an operation for receiving PUCCH on the SCell in the dormant state.

The BS may transmit a CQI report period parameter(s) for channel state information reporting for the SCell in the dormant state. For example, the BS receives channel state information from the UE at a period set based on the CQI report period parameter(s). In this case, the CQI report period parameter(s) for transmitting channel state information for a SCell in the dormant state is distinguished from a CQI report period parameter(s) for transmitting channel state information for a SCell in the activation state. That is, the BS transmits the activation state CQI report period parameter(s) and the dormant state CQI report period parameter(s) and periodically receives channel state information by applying a specific period parameter according to a state of the SCell.

In addition, the BS may perform operations for performing operations of the UE described with reference to FIGS. 1 to 8.

As described above, according to the embodiments of the present disclosure, the UE may control a state of a SCell to the dormant state, the activation state, or the deactivation state depending on the control of the BS. In addition, since the UE transmits channel state information for a SCell in the dormant state to a BS, the UE may reduce delay time when causing the SCell to transition into the activation state to use the SCell.

Hereinafter, the above-described dormant state control method and control timing will be described in more detail with various embodiments.

Various embodiments for indicating a state of a SCell through a MAC CE will be described.

A BS may transmit a MAC CE to a UE to indicate the dormant state for one or more SCells.

Embodiment 1: A Method of Indicating the Dormant State Using a R Bit in the MAC CE Field For example, the BS may utilize a typical activation/deactivation MAC CE (or a typical activation/deactivation MAC CE format) to indicate the dormant state for a SCell configured on a UE. For example, the indication will be given as follows.

The R field may be set to 1 to indicate the dormant state that is distinct from the activation state.

When the R field has been set to 1, the Ci field may be set to 1 to indicate that a SCell having a SCellIndex i shall be hibernated in the dormant state. As another embodiment, the Ci field may be set to 0 to indicate that the SCell having a SCellIndex i shall be hibernated. In this case, the Ci field may be set to 1 for indicating the remaining states.

When the R field has been set to 1, the Ci field is set to 0 to indicate that the SCell having a SCellIndex i shall be deactivated.

As another example, when the R field has been set to 1, the Ci field may be set to 0 to indicate that the SCell having the SCellIndex i shall be activated.

As further another example, regardless of the R field, the Ci field may be set to 0 to indicate that the SCell with the SCellIndex i shall be deactivated.

As still another example, LCID values may be 11011 in the case of the activation/deactivation MAC CE having one octet, and the LCID value may be 110000 in the case of the activation/deactivation MAC CE having four octets.

As another example, information for instructing operations, such as on/indicating/enabling/configuring may be transmitted to the UE through an RRC reconfiguration message.

Embodiment 2: A Method of Indicating the Dormant State Using One (or a Specific Bit) of the Ci Fields in the MAC CE Field For example, the BS may use a typical activation/deactivation MAC CE (or a typical activation/deactivation MAC CE format) to indicate the dormant state for a SCell configured on a UE.

As one example, one field or a bit in an activation/deactivation MAC CE may be used to indicate the dormant state that is distinct from the activation state. For example, the corresponding field or bit is set to 1.

As another example, one specific Ci in the activation/deactivation MAC CE may be used to indicate the dormant state that is distinct from the activation state. For example, the corresponding field or bit is set to 1 (or a dedicated value).

For example, a field or bit for indicating activation/deactivation may be configured on the UE through an RRC connection reconfiguration message. For example, information for indicating/enabling/configuring the operation may be configured on the UE through an RRC connection reconfiguration message. As another example, a field or bit for indicating the dominant state may be previously configured, and information for indicating/enabling/configuring such an operation may be configured on the UE through an RRC connection reconfiguration message. For another example, the BS does not configure a SCell having a Scell index or a servecell index of a corresponding field on the UE. As a result, the corresponding index may be utilized as a field or bit for indicating the dormant state described above.

If the field or bit for indicating the dormant state is set to 1, the remaining fields (or Ci fields that are not used for indicating the dormant state) are set to 1 in order to indicate that the SCell having the SCellIndex i shall be hibernated in the dormant state. If the field or bit is set to 0 to indicate that the SCell with the SCellIndex i shall be hibernated, the field or bit is set to 1 to indicate the remaining states.

For example, when the field or bit for indicating the dormant state has been set to 1, the remaining fields or the Ci fields that are not used for indicating the dormant state are set to 0 to indicate that the SCell having the SCellIndex i shall be deactivated.

As another example, when the field or bit for indicating the dormant state has been set to 1, the remaining fields or the Ci fields that are not used for indicating the dormant state are set to 0 to indicate that the SCell having the SCellIndex i shall be activated.

As further another example, regardless of the field or bit for indicating the dormant state, the remaining fields or the Ci fields that are not used for indicating the dormant state may be set to 0 to indicate that the SCell having the SCellIndex i shall be deactivated.

As still another example, LCID values may be used with the same values as the typical activation/deactivation MAC CE (for example, in the case of the activation/deactivation MAC CE of one octet, LCID value may be 11011, and in the case of the activation/deactivation MAC CE of four octets, the LCID value may be 11000).

Embodiment 3: A Method of Indicating the Dormant State Using a Reserved LCID Value As described above, for example, a new LCID distinct from the LCID of the typical activation/deactivation MAC CE may be assigned to indicate the dormant state.

In one example, the BS may utilize the same format as the typical activation/deactivation MAC CE, but assign a new LCID distinct from the LCID of the typical activation/deactivation MAC CE. For example, the indication will be given as follows.

Here, a SCell is assigned with a SCell index (SCellIndex) i, where "i" denotes an index of the SCell. A Ci field indicates the dormant state of a SCell having the SCellIndex i. Otherwise, the MAC entity shall ignore the Ci field. For example, the Ci field is set to 1 to indicate that a SCell having the SCellIndex i is required to transition to the dormant state. The Ci field is set to 0 to indicate that a SCell having the SCellIndex i is required to be deactivated.

As another example, the Ci field is set to 1 to indicate that a SCell having the SCellIndex i is required to transition to the dormant state. The Ci field is set to 0 to indicate that a SCell having the SCellIndex i is required to be activated.

As another example, the Ci field is set to 0 to indicate that a SCell having the SCellIndex i is required to transition to the dormant state. The Ci field is set to 1 to indicate that a SCell having the SCellIndex i is required to be activated.

The R field is set to 0 as a reserved bit.

Meanwhile, it is possible to i) define a dormant/activation MAC CE and a dormant/deactivation MAC CE, ii) assign a new LCID distinct from the LCID of the typical activation/deactivation MAC CE, and therefore iii) indicate dormancy/activation and dormancy/deactivation, respectively.

In the case of the dormant/activation MAC CE, if a SCell is assigned with a SCell index (SCellIndex) i, the corresponding Ci field indicates the dormant state of a SCell having the SCellIndex i. Otherwise, the MAC entity shall ignore the Ci field. For example, the Ci field is set to 1 to indicate that a SCell having the SCellIndex i is required to transition to the dormant state. The Ci field is set to 0 to indicate that a SCell having the SCellIndex i is required to be activated.

In the case of the dormant/deactivation MAC CE, if a SCell is assigned with a SCell index (SCellIndex) i, the corresponding Ci field indicates the dormant state of a SCell configured with the SCellIndex i. Otherwise, the MAC entity shall ignore the Ci field. For example, the Ci field is set to 1, to indicate that a SCell having the SCellIndex i is required to transition to the dormant state. The Ci field is set to 0 to indicate that a SCell having the SCellIndex i is required to be deactivated.

As another example, the Ci field is set to 1 to indicate that a SCell having the SCellIndex i is required to transition to the dormant state. The Ci field is set to 0 to indicate that a SCell having the SCellIndex i is required to be in another state other than the dormant state. If the corresponding MAC CE is intended to indicate a transition between the dormant state and the activation state, a UE (MAC entity, hereinafter, the UE may be referred to as a MAC entity) transitions to or remains the dormant state when a SCell in the activation state (or dormant state) is instructed to be in the dormant state (set to "1"). When the cell in the dormant state (or activation state) is instructed to transit into the activation state (set to "0"), the UE transitions to or remains the activation state. When a cell in the deactivation state is indicated by a corresponding MAC CE, the UE may ignore the corresponding Ci field.

If the corresponding MAC CE is intended to indicate a transition between the dormant state and the deactivation state, the UE transitions to or remains the dormant state when a SCell in the deactivation state (or dormant state) is instructed to be in the dormant state (set to "1"). When the cell in the dormant state (or deactivation state) is instructed to be in the deactivation state (set to "0"), the UE transitions to or remains the deactivation state. When a cell in the activation state is indicated by a corresponding MAC CE, the UE may ignore the corresponding Ci field.

As another example, the MAC CE may be comprised of one MAC CE, and a 1 bit field may be required to distinguish whether the corresponding MAC CE is for indicating a transition between the dormant state and the activation state, or a transition between the dormant state and the deactivation state.

Embodiment 4: A Method of Indicating a Dormant State MAC CE Using One LCID Field FIG. 10 is a diagram illustrating a list of logical channel identifier (LCID) values for a DL-SCH according to an embodiment of the present disclosure.

As shown in FIG. 10, in the typical LTE technology, the LCID value includes 5 bits. Therefore, logical channels, MAC CEs, padding, and the like are required to be divided into 32 or less. However, the number of remaining spare bits is not large. Thus, it may be a waste i) if two dormant MAC CEs for both one octet and four octets are used for a dormant MAC CE or ii) if a new LCID is defined for a dormant/deactivation MAC CE or a dormant/activation MAC CE.

In order to not waste, it is possible to define a dormant MAC CE format of one octet to four octets using one LCID, or it is possible to define a new MAC CE format for indicating activation/deactivation, using one LCID. That is, it is possible to define a dormant MAC CE format of varying length or a MAC CE format for indicating activation/deactivation, through one MAC CE format.

FIG. 11 is a diagram illustrating a format of a MAC CE according to another embodiment of the present disclosure.

Referring to FIG. 11, for example, a MAC CE format may include a length (Len) field to indicate whether a CSi field equal to or greater than a specific number (for example, 6 bits or 7 bits) or a Cell State i (state information of a SCell having a serving cell index/SCellindex i) is included. The length field may be referred to as variable length indication information or a MAC CE size field (bit). The length field may be replaced by any term having the same meaning and may include one bit, two bits or three bits. The length (Len) field including one bit will be described as a reference, but the embodiments of the present disclosure are not limited thereto.

If the length field/bit is set to 1, CSi fields may be included up to a specific number (e.g., serving cell index/SCellindex 7 or 15 or 23). If the length field/bit is set to 0, CSi fields may be included up to all SCell indexes (e.g., serving cell index/SCellindex 31).

For example, if the length field/bit is set to 1, CSi fields may be included up to serving cell index/SCellindex 7 or 15 or 23. If the length field/bit is set to 0, CSi fields may be included up to serving cell index/SCellindex 31.

The Len field/bit including two bits will be described. The length field/bit may have four values of 00, 01, 10 and 11. Through this, it is possible to indicate each of the CSi fields up to the serving cell index/SCellindex 7, the CSi fields up to the serving cell index/SCellindex 15, the CSi fields up to the serving cell index/SCellindex 23, and the CSi fields up to the serving cell index/SCellindex 31. For example, if the length field is set to 00, the CSi fields may be included up to the serving cell index/SCellindex 7. If the length field is set to 01, the CSi fields may be included up to the serving cell index/SCellindex 15. If the length field is set to 10, the CSi fields may be included up to the serving cell index/

SCellindex 23. If the length field is set to 11, the CSi fields may be included up to the serving cell index/SCellindex 31.

Hereinafter, the CSi field will be described.

For example, a state CSi field of a SCell having serving cell index/SCellindex i may be composed of 1 bit field when only the dormant and activation states are defined or only the dormant and deactivation states are defined.

As another example, a state CSi field of a SCell having serving cell index/SCellindex i may be made of 2 bit field when the dormant, activation and deactivation states are defined. The dormant state, activation state, and deactivation state may be distinguished by three values of 00, 01, 10, and 11 that can be configured using 2 bits, and the remaining value may be set as spare/reserved bits. When indicated with the remaining one value in the corresponding CSi field, a UE may ignore the CSi field.

Meanwhile, an extension field may be used instead of using the length field/bit.

As another example of a varying length MAC CE, it may be possible to defined an extension field indicating a flag to indicate whether more CSi fields are provided on a per one octet basis or on a per two octet basis. For example, the extension field may be included in a bit(s) next to the reserved bit if the extension field is used in the start bit of each octet, or in the last bit of each octet.

In one example, CSi fields included in at least one octet may be included when the extension field indicating a flag for indicating whether more CSi fields are provided per one octet is set to 1. Up to seven CSi fields may be included if the CSi field includes' bit. Up to 3 CSi fields may be included if the CSi field is comprised of 2 bits. If this extension field is set to 0, it indicates that one MAC SDU or padding is to be started in the next byte.

In one example, CSi fields included in at least two octets may be included when the extension field indicating a flag for indicating whether more CSi fields are provided per two octets is set to 1. Up to 15 CSi fields may be included if the CSi field is composed of 1 bit. Up to 7 CSi fields may be included if the CSi field is made of 2 bits. If this extension field is set to 0, it indicates that one MAC SDU or padding is to be started in the next byte.

As another example, the subheader of a corresponding MAC CE may include information for distinguishing a MAC CE for 1 octet and a MAC CE for 4 octets. As another example, the subheader of a corresponding MAC CE may include information for indicating the number of octets of the MAC CE through a field representing the number of octets or a length field.

It is possible to include information to indicate whether the remaining state(s) is the activation state or the deactivation state according to the R field, using the R field (or a specific field) on the MAC CE indicating the dormant state. For example, in the case of the dormant MAC CE, if a SCell configured is assigned with a SCell index (SCellIndex) i, the Ci field indicates the dormant state of a SCell having the SCellIndex i. Otherwise, the MAC entity shall ignore the Ci field. In one example, the Ci field is set to 1 to indicate that a SCell having the SCellIndex i is required to transition to the dormant state. When the R field is set to 0, the Ci field is set to 0 to indicate that the SCell with the SCellIndex i shall be deactivated. When the R field is set to 1, the Ci field is set to 0 to indicate that the SCell with the SCellIndex i shall be activated. As another example, the Ci field is set to 1 to indicate that a SCell having the SCellIndex i is required to transition to the dormant state. When the R field is set to 0, the Ci field is set to 0 to indicate that the SCell with the SCellIndex i shall be activated. When the R field is set to 1, the Ci field is set to 0 to indicate that the SCell with the SCellIndex i shall be deactivated. For convenience of description, although the R field has been described, it is also included in the scope of the present disclosure to designate and process arbitrary fields included in the MAC CE as described above.

Figure 12:
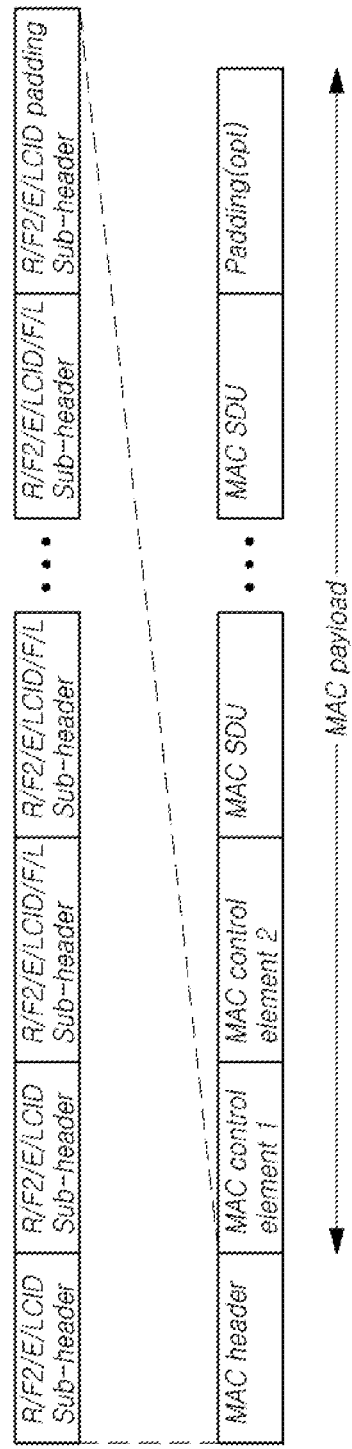
FIG. 12 is a diagram illustrating a format of a MAC PDU including a MAC header and a MAC payload according to at least one embodiment of the present disclosure.

Embodiment 5: A Way of Distinguishing MAC CEs Indicating the Dormant State by Increasing the LCID Field Value to 6 Bits FIG. 12 is a diagram illustrating a format of a MAC PDU including a MAC header and a MAC payload according to at least one embodiment of the present disclosure. FIG. 13 is a diagram illustrating a format of a MAC subheader.

Referring to FIG. 12, the typical LTE LCID field value of 5 bits may be increased to 6 bits. In this case, the MAC subheader value is increased to 6 bits, which seriously affects byte the aligned MAC subheader.

Specifically, referring to the MAC subheader format of FIG. 13, if the LCID increases from 5 bits to 6 bits, one more byte may be required. That is, the LCID is increased by one bit, but the MAC subheader is required to increase by one byte. As one example to prevent such inefficiency, the R field included in the MAC subheader format may be combined with the LCID field to configure a LCID with a 6-bit LCID.

As another example, one bit on an arbitrary field included in the MAC subheader format may be combined with bits in the LCID field to configure a LCID with a 6-bit LCID.

As described above, embodiments have been described in which the BS indicates the dormant state for a SCell to the UE, through various formats and utilization of the MAC CE. Embodiments described above may be taken individually or in combination partly or entirely.

Hereinafter, operations of a UE will be described with reference to timing when the UE receives a MAC CE indicating the dormant state.

FIG. 14 is a diagram illustrating timing for receiving each of activation state indication information, dormant state indication information, and deactivation state indication information for a SCell according to at least one embodiment of the present disclosure.

Referring to FIG. 14, description will be given for operations performed by a UE in terms of timing when a MAC CE including SCell state indication information indicating each state is received will be described.

In one example, when the UE receives a MAC CE indicating the dormant state, the UE may perform CSI reporting at time point n+8 (or after the time point n+8 or at a first period after the time point n+8) from time point n when a corresponding MAC CE message is received. The UE may start or restart an associated timer.

As another example, when the UE receives a MAC CE indicating the dormant state, the UE may perform periodic CSI reporting after time point n+8 from time point n when a corresponding MAC CE message is received and before time point n+24 or n+34. The UE may start or restart an associated timer.

As another example, when the UE receives a MAC CE indicating the dormant state, the UE may perform periodic CSI reporting before time point n+24 or n+34 from time point n when a corresponding MAC CE message is received. The UE may start or restart an associated timer.

As another example, when the UE receives an RRC connection reconfiguration message including information indicating the dormant state, the UE may perform periodic CSI reporting at time point n+8 from i) the time point when the RRC connection reconfiguration message is received, ii) the time point when the RRC connection reconfiguration message is processed and decoded, or iii) the time point when an RRC connection reconfiguration completion message is transmitted. The UE may start or restart an associated timer.

As another example, when the UE receives an RRC connection reconfiguration message including information indicating the dormant state, the UE may perform periodic CSI reporting before time point n+24 or n+34 from the time point when the RRC connection reconfiguration message is received. The UE may start or restart an associated timer.

As another example, when the UE receives an RRC connection reconfiguration message including information indicating the dormant state, the UE may perform periodic CSI reporting at time point n+8 from the time point when the decoding of the RRC connection reconfiguration message is completed. The UE may start or restart an associated timer.

As another example, when the UE receives an RRC connection reconfiguration message including information indicating the dormant state, the UE may perform periodic CSI reporting at the time point when an RRC connection reconfiguration completion message is transmitted. The UE may start or restart an associated timer.

As another example, when the UE receives an RRC connection reconfiguration message including information indicating the dormant state, the UE may perform periodic CSI reporting at the time point when an offset parameter(s) indicated by a BS (being included in the RRC connection reconfiguration message) is applied based on a time point when an RRC connection reconfiguration completion message is transmitted. The UE may start or restart an associated timer.

As another example, when the UE receives an RRC connection reconfiguration message including information indicating the dormant state, the UE may perform CSI reporting at the first period of periodic CSI reporting from the time point when an RRC connection reconfiguration completion message is transmitted. The UE may start or restart an associated timer.

As another example, when the UE receives an RRC connection reconfiguration message including information indicating the dormant state, the UE may perform periodic CSI reporting at an earliest time point from the time point when an RRC connection reconfiguration completion message is transmitted. The UE may start or restart an associated timer. In this case, the earliest time point shall be within time point n+24 or n+34 from the time point when the RRC reconnection message is received or when the decoding of the RRC connection reconfiguration message is completed.

As described above, when the UE receives the SCell state indication information indicating the dormant state, the UE transmits the channel state information to the BS at a specific time.

Hereinafter, a method of a UE for rapidly transmitting data through a SCell by reducing time for estimating and reporting an initial valid CQI, after having received information indicating the activation state for a SCell through the activation/deactivation MAC CE will be described.

SCell activation delay is caused by CQI computation delay (4~6 ms), time for waiting valid resources for CSI measurement report, time for RF re-tuning, and the like.

A UE may perform CSI reporting when it reaches n+8 after the time (n) when an activation command is received. Therefore, if the UE is allowed to inform the network that it is ready to use an activated SCell by transmitting an UL signal in a short period of time, it is possible to reduce delay in activating the SCell to transmit data.

When an UL resource is allowed/assigned in a corresponding SCell, the UE transmits CQI reporting to the BS in a short period of time.

The BS may enable a CQI reporting resource of a short period to be available to the UE when an SCell activation command is received.

To do this, the UE may be assigned with a specific CQI resource on the SCell. As another example, the UE may be allocated with a specific CQI resource for the corresponding SCell on the PCell. As another example, the UE may be allocated with a specific CQI resource for the corresponding SCell on a PUCCH SCell. The BS may provide information on a specific CQI resource, which is included in the RRC connection reconfiguration message, to the UE.

When the UE receives a SCell activation command, the UE transmits a CQI report (for convenience of description, CQI reporting is used and also includes a channel quality indicator (CQI) report, a precoding matrix indicator (PMI) report, a rank indicator (RI) report, a procedure transaction identifier (PTI) report, a CSI-RS Resource Indicator (CRI) report) through the PCell or another SCell or PUCCH SCell, to indicate that the corresponding SCell has been activated. Alternatively, the UE may report through the SCell in the activation state.

To avoid a load on a PUCCH resource, the short period of the CQI reporting resource shall be available only when a SCell activation command is received. However, if the UE transmits CQI reporting through the PUCCH, load may be caused because the PUCCH resource is continuously used when the SCell activation command is received.

To solve this problem, it is necessary for the UE to perform switching/fallback/conversion in a normal period (or a period set longer than a short period for indicating/informing SCell activation to the BS).

For example, when a UE receives a SCell activation command (if a MAC CE indicating SCell activation is received), i) a CQI configuration having a short CQI reporting period (for valid CQI reporting) and ii) a CQI configuration having a CQI reporting period of a normal period (or a period longer than a short period for indicating/informing the SCell activation to the BS) in the activation state may be performed at the UE through the RRC connection reconfiguration message. That is, as described above, the BS may configure a CQI report period parameter for transmitting channel state information in the activation state and a CQI report period parameter for transmitting channel state information in the deactivation state for the UE.

As another example, when the UE receives a MAC CE indicating SCell activation, a CQI configuration having a short CQI reporting period (for valid CQI reporting) may include one or more pieces of information for indicating i) a CQI reporting start offset for corresponding CQI reporting, ii) a corresponding CQI reporting period (e.g., 1 ms), and iii) number of repetitions of corresponding CQI reporting. The CQI reporting period may be pre-configured with a specific value for a UE capable of a corresponding function. For example, if the CQI reporting is transmitted as many times as the number of repetitions of the CQI reporting, the UE may perform switching/fallback/conversion in a CQI reporting period of a normal period (or a period longer than a short period for indicating/informing SCell activation to the BS) in the activation state.

As another example, when receiving a MAC CE indicating SCell activation, the UE reports the CQI through a short CQI reporting period. When the UE receives resource allocation (ex, DL allocation, UL grant) for a corresponding SCell form the BS, the UE may perform switching/fallback/conversion in a CQI reporting period of a normal period in the activation state.

As another example, when the UE receives a MAC CE indicating SCell activation, the UE reports the CQI through a short CQI reporting period. When a specific subframe is exceeded in a subframe(s) that has received a MAC CE, the UE may perform switching/fallback/conversion in a CQI reporting period of a normal period in the activation state. After having received the SCell activation indication, the corresponding specific subframe may be 24 or 34 subframes in which SCell activation operation is applied. A BE configures the corresponding subframe for a UE or may preconfigure the corresponding subframe with a specific value for a UE capable of a corresponding function.

As another example, when the UE receives a MAC CE indicating SCell activation, the UE reports the CQI through a short CQI reporting period. The UE may perform switching/fallback/conversion in a CQI reporting period of a normal period in the activation state at a time corresponding to the minimum value/time of the operation/method/time.

As described above, the UE configures a period parameter for CQI reporting in the dormant state separated from a period parameter for CQI reporting in the activation state and may transmit a CQI report according to the corresponding configuration and a state of the SCell. In addition, the CQI reporting period may be changed according to methods described above.

According to the above-described embodiments of the present disclosure, the UE may rapidly activate the SCell to transmit user data. Thus, the offloading effect may be improved by reducing delay for activating a SCell from the dormant state and allowing data through the SCell to be transmitted rapidly.

Hereinafter, a UE and a BS capable of performing a part or all of embodiments described above will be discussed again with reference to the drawings.

Figure 15:
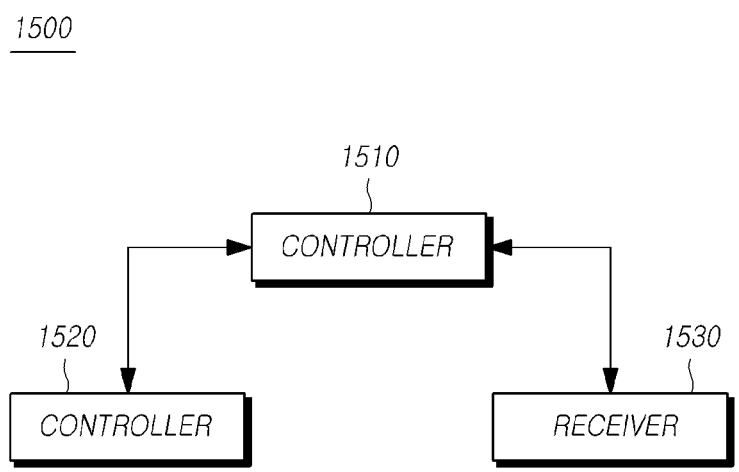
FIG. 15 is a block diagram illustrating a user equipment according to at least one embodiment of the present disclosure.

FIG. 15 is a block diagram illustrating a UE according to at least one embodiment of the present disclosure.

Referring to FIG. 15, a UE 1500 controlling states of a SCell may include a receiver 1530 configured to receive SCell state indication information indicating a state for the SCell from a BS through an RRC message or a MAC control element, a controller 1510 configured to cause a state of the SCell to transition into the dormant state when the SCell state indication information indicates the dormant state, and a transmitter 1520 configured to transmit channel state information reporting for the SCell in the dormant state according to an dormant state CQI report period parameter set separately from an activation state CQI report period parameter.

For example, the receiver 1530 may receive SCell state indication information through higher layer signaling or a MAC CE. The higher layer signaling may denote an RRC message. The higher layer signaling and the MAC CE may be received depending on a situation such as whether the UE configures a SCell.

In one example, the SCell state indication information may be contained in an RRC connection reconfiguration message that the receiver 1530 receives for configuring a SCell. For example, the SCell state indication information received through the RRC message may be composed of 1 bit parameter indicating the activation state or the dormant state. If configuration information for configuring the SCell is contained in the RRC message, but a parameter for the SCell state indication information is not contained in the configuration information, the controller 1510 may configure the SCell to be in the deactivation state. Thereafter, the controller 1510 may control a state of the SCell according to SCell state indication information received through the MAC CE.

As another example, after having configured the SCell, the receiver 1530 may dynamically receive state indication information of the SCell through the SCell state indication information by the MAC CE. For example, the MAC CE including the SCell state indication information may have a format including a field for indicating a state for the SCell as the activation state or the dormant state for each SCell index. As another example, the MAC CE including the SCell state indication information may have a format including a field for indicating a state for the SCell as the activation state or the deactivation state for each SCell index.

In other words, the MAC CE may be divided into a first MAC CE set to indicate a state for each SCell index as the activation state or the deactivation state, and a second MAC CE set to indicate a state for each SCell index as the dormant state or the activation state. In this case, the first MAC CE and the second MAC CE are identified by MAC PDU subheaders having logical channel IDs (LCID) different from each other.

For example, the controller 1510 checks whether SCell state indication information is contained in the RRC message or the MAC CE and controls a state of the SCell according to the SCell state indication information. In an example, when the SCell state indication information indicates the dormant state, the controller 1510 may configure a state of the SCell to be in the dormant state or cause the state of the SCell to transition into the dormant state.

In an example, when an RRC message for configuring the SCell on the UE is received and SCell state indication information is contained in the RRC message, the controller 1510 may configure the SCell to be in a state indicated by the SCell state indication information. That is, when configuring the SCell on the UE, the controller 1510 may configure the SCell to be in the activation state or in the dormant state according to the SCell state indication information. If SCell state indication information is not contained in the RRC message for configuring the SCell, the controller 1510 may configure the SCell to be in the deactivation state.

As another example, the receiver 1530 may receive a MAC CE indicating a state for the configured SCell. For example, the MAC CE including the SCell state indication information may include a field for indicating a state for the SCell as the activation state or the dormant state for each SCell index.

Specifically, if a value of an index field for the SCell is set to a value indicating the activation state, and if a state for the SCell indicated by the index is the dormant state, the controller 1510 may change a state of the SCell to transition into the activation state.

As another example, when a value of an index field of the SCell is set to a value indicating the activation state, and when a state for the SCell is not the dormant state, the controller 1510 may ignore the index field value. That is, the current state of the SCell may be remained.

As another example, as described above, there may be two types of MAC CEs: a first MAC CE and a second MAC CE. The first MAC CE indicates a state for the SCell as the activation or deactivation state, and the UE may control a state of the SCell according to the corresponding indication information. The second MAC CE indicates a state for the SCell as the activation or dormant state, and the UE may control a state of the SCell according to a value of an index field described above and the current state of the corresponding SCell.

In addition, when both the first MAC CE and the second MAC CE are received, the controller 1510 may determine a state of the corresponding SCell by combining the values of the SCell index fields indicated by the two MAC CEs. For example, it is possible for the UE to determine whether SCell state indication information indicates the dormant state by combining values of index fields for the SCell included in each of the first MAC CE and the second MAC CE.

For example, if the SCell is in the dormant state, the transmitter 1520 may report channel state information for the SCell. Specifically, the transmitter 1520 may report CQI/PMI/RI/PTI/CRI for the SCell in the dormant state. In this case, the controller 1510 does not transmit SRS on the SCell in the dormant state. In addition, the transmitter 1520 does not transmit UL-SCH and RACH on the SCell in the dormant state. In addition, the controller 1510 does not monitor PDCCH on the SCell in the dormant state. The UE does not monitor the PDCCH for the SCell in the dormant state. The transmitter 1520 does not also transmit PUCCH on the SCell in the dormant state.

The transmitter 1520 may use a CQI report period parameter(s) for channel state information reporting for the SCell in the dormant state. For example, the transmitter 1520 reports channel state information to a BS at a period set based on the CQI report period parameter(s). In this case, the CQI report period parameter(s) for transmitting channel state information for a SCell in the dormant state is distinguished from a CQI report period parameter(s) for transmitting channel state information for a SCell in the activation state. That is, the receiver 1530 receives the activation state CQI report period parameter(s) and the dormant state CQI report period parameter(s), and the transmitter 1520 periodically transmits channel state information by applying one of the period parameters according to a state of the SCell.

In addition, the controller 1510 controls the overall operation of the UE 1500 to control the dormant state control and the channel state information transmission operation for the SCell in a CA situation required for performing the embodiments.

The transmitter 1520 and the receiver 1530 are used to transmit, to the BS and receive from the BS, signals, messages, and data necessary for performing embodiments of the present disclosure.

Figure 16:
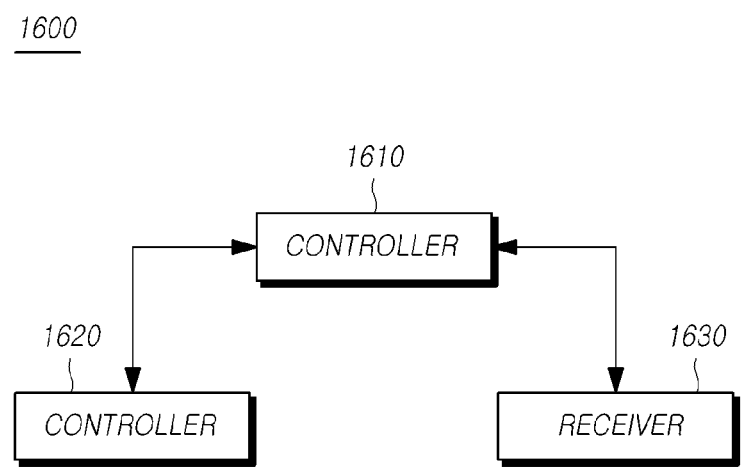
FIG. 16 is a block diagram illustrating a base station according to at least one embodiment of the present disclosure.

FIG. 16 is a block diagram illustrating a BS according to at least one embodiment of the present disclosure.

Referring to FIG. 16, a BS 1600 controlling states of a SCell of a UE may include a transmitter 1620 configured to transmit secondary cell (SCell) state indication information indicating a state for the SCell to a UE through an RRC message or a MAC control element, and when the SCell enters the dormant state according to the SCell state indication information, a receiver 1630 configured to receive channel state information reporting for the SCell in the dormant state according to an dormant state CQI report period parameter set separately from an activation state CQI report period parameter.

For example, the transmitter 1620 may transmit SCell state indication information through higher layer signaling or a MAC CE. The higher layer signaling may denote an RRC message. The higher layer signaling and the MAC CE may be transmitted depending on a situation such as whether the UE configures a SCell.

For example, the SCell state indication information may be contained in an RRC connection reconfiguration message that the transmitter 1620 transmits for configuring a SCell. For example, the SCell state indication information transmitted through the RRC message may include 1 bit parameter indicating the activation state or the dormant state. If configuration information for configuring the SCell is contained in the RRC message, but a parameter for the SCell state indication information is not contained in the configuration information, the UE may configure the SCell to be in the deactivation state. Thereafter, the BS 1600 may control a state of the SCell according to SCell state indication information transmitted through the MAC CE.

As another example, after the UE has configured the SCell, the transmitter 1620 may dynamically transmit SCell state indication information through the MAC CE. For example, the MAC CE including the SCell state indication information may have a format including a field for indicating a state for the SCell as the activation state or the dormant state for each SCell index. As another example, the MAC CE including the SCell state indication information may have a format including a field for indicating a state for the SCell as the activation state or the deactivation state for each SCell index.

In other words, the MAC CE may be divided into a first MAC CE set to indicate a state for each SCell index as the activation state or the deactivation state, and a second MAC CE set to indicate a state for each SCell index as the dormant state or the activation state. In this case, the first MAC CE and the second MAC CE are identified by MAC PDU subheaders having logical channel IDs (LCID) different from each other.

Meanwhile, if the SCell of the UE is in the dormant state, the receiver 1530 may receive channel state information for the SCell. Specifically, the receiver 1530 may receiver CQI/PMI/RI/PTI/CRI for the SCell in the dormant state. However, as described above, the receiver 1530 does not receive the SRS on SCell in the dormant state. In addition, the receiver 1530 does not receive UL-SCH and RACH on the SCell in the dormant state. In addition, the transmitter 1520 does not transmit PDCCH on the SCell in the dormant state. The transmitter does not transmit the PDCCH for the SCell in the dormant state. The controller 1510 does not also perform an operation for receiving PUCCH on the SCell in the dormant state.

The transmitter 1520 may transmit a CQI report period parameter(s) for channel state information reporting for the SCell in the dormant state. For example, the receiver 1530 receivers channel state information from the UE at a period set based on the CQI report period parameter(s). In this case, the CQI report period parameter(s) for transmitting channel state information for a SCell in the dormant state is distinguished from a CQI report period parameter(s) for transmitting channel state information for a SCell in the activation state. That is, the transmitter 1520 transmits the activation state CQI report period parameter(s) and the dormant state CQI report period parameter(s), and the receiver 1530 periodically receivers channel state information by applying one of the period parameters according to a state of the SCell.

In addition, the controller 1610 controls the overall operation of the BS 1600 to control the dormant state control and the channel state information transmission operation for the SCell in a CA situation required for performing the embodiments.

The transmitter 1620 and the receiver 1630 are used to transmit, to the UE and receive from the UE, signals, messages, and data necessary for performing embodiments of the present disclosure.

The embodiments described above may be supported by the standard documents disclosed in at least one of the wireless access systems IEEE 802, 3GPP and 3GPP2. That is, the steps, configurations, and parts not described in the present embodiments for clarifying the technical idea may be supported by standard documents described above. In addition, all terms disclosed herein may be described by the standard documents described above.

The embodiments described above may be implemented by various means. For example, the embodiments of the present disclosure may be implemented by hardware, firmware, software, or a combination thereof.

In the case of hardware implementation, the method according to embodiments may be implemented by one or more of application specific integrated circuits (ASICs), digital signal processors (DSPs), digital signal processing devices (DSPDs), programmable logic devices (PLDs) (Field Programmable Gate Arrays), a processor, a controller, a microcontroller, a microprocessor, or the like.

In the case of an implementation by firmware or software, the method according to the embodiments may be implemented in the form of an apparatus, a procedure, or a function for performing the functions or operations described above. The software code may be stored in a memory unit and driven by the processor. The memory may be located inside or outside the processor, and may exchange data with the processor by various well-known means.

The terms "system", "processor", "controller", "component", "module", "interface", "model", "unit", and the like, described above may generally refer to computer-related entity hardware, a combination of hardware and software, software, or software in execution. For example, components described above may be, but are not limited to, a process driven by a processor, a processor, a controller, a control processor, an entity, an execution thread, a program and/or a computer. For example, an application running on a controller, controller or processor can be a component. One or more components can be included within a process and/or thread of execution, and a component can be placed on one system or be disposed on more than one system.

The features, structures, configurations, and effects described in the present disclosure are included in at least one embodiment but are not necessarily limited to a particular embodiment. A person skilled in the art can apply the features, structures, configurations, and effects illustrated in the particular embodiment embodiments to another one or more additional embodiment embodiments by combining or modifying such features, structures, configurations, and effects. It should be understood that all such combinations and modifications are included within the scope of the present disclosure. Accordingly, the embodiments of the present disclosure are intended to be illustrative rather than limiting, and the scope of the present invention is not limited by these embodiments. The scope of protection of the present disclosure is to be construed according to the claims, and all technical ideas within the scope of the claims should be interpreted as being included in the scope of the present invention.

What is claimed is:

1. A method of controlling states of a secondary cell by a user equipment, the method comprising:
   receiving secondary cell (SCell) state indication information indicating a state for the SCell from a base station through an radio resource control (RRC) message or a medium access control (MAC) control element;
   causing, by the user equipment, a state of the SCell to transition into a dormant state when the SCell state indication information indicates the dormant state; and
   transmitting channel state information reporting for the SCell in the dormant state according to a dormant state channel quality indicator (CQI) report period parameter set separately from an activation state CQI report period parameter,
   wherein the dormant state that allows the user equipment and the base station to perform operations for reporting channel state information for the SCell while restricting to operations for transmitting a sounding reference signal (SRS), uplink shared channel (UL-SCH), and random access channel (RACH) on the SCell, monitoring physical data control channel (PDCCH) on the SCell, and transmitting PUCCH on the SCell, and
   wherein the SCell state indication information received through the RRC message includes one bit parameter indicating one of an activation state and the dormant state.

2. The method according to claim 1, further comprising, when the RRC message excludes the SCell state indication information, configuring the SCell to be in a deactivation state and changing the state of the SCell to the dormant state according to the MAC control element.

3. The method according to claim 1, wherein the MAC control element including the SCell state indication information has a format including a field for indicating the state of the SCell as one of the activation state and the dormant state for each SCell index.

4. The method according to claim 3, further comprising, when a value of an index field for the SCell is set to a value indicating the activation state and the state of the SCell is the dormant state, transitioning the state of the SCell to the activation state.

5. The method according to claim 3, further comprising, when a value of an index field for the SCell is set to a value indicating the activation state and the state of the SCell is not the dormant state, ignoring the value of the index field.

6. The method according to claim 1, wherein the MAC control element is divided into i) a first MAC control element indicating a state for each SCell index as one of the activation state and the deactivation state and ii) a second MAC control element indicating a state for each SCell index as one of the dormant state and the activation state,
   wherein the first MAC control element and the second MAC control element are identified by MAC protocol data unit (PDU) subheaders having logical channel identifiers (IDs) different from each other.

7. The method according to claim 6, further comprising, when both the first MAC control element and the second MAC control element are received, determining whether the SCell state indication information indicates the dormant state by combining values of index fields for the SCell included in each of the first MAC control element and the second MAC control element.

8. A method of controlling states of a secondary cell by a base station, the method comprising:
   transmitting secondary cell (SCell) state indication information indicating a state for the SCell to a user equipment through an radio resource control (RRC) message or a medium access control (MAC) control element; and
   when the SCell is configured to be in a dormant state according to the SCell state indication information, receiving channel state information reporting for the SCell in the dormant state according to a dormant state CQI report period parameter set separately from a activation state CQI report period parameter, wherein the dormant state that allows the user equipment and the base station to perform operations for reporting channel state information for the SCell while restricting to operations for transmitting a sounding reference signal (SRS), uplink shared channel (UL-SCH), and random access channel (RACH) on the SCell, monitoring physical data control channel (PDCCH) on the SCell, and transmitting PUCCH on the SCell, wherein the RRC message contains SCell configuration information for configuring the SCell on the user equipment, and wherein the SCell state indication information includes one bit parameter indicating an activation state or the dormant state.

9. The method according to claim 8, wherein the MAC control element includes a format including a field for indicating a state of the SCell as one of the activation state and the dormant state for each SCell index.

10. The method according to claim 8, wherein the MAC control element is divided into a first MAC control element indicating a state for each SCell index as one of the activation state and the deactivation state and a second MAC control element indicating a state for each SCell index as one of the dormant state and the activation state, wherein the first MAC control element and the second MAC control element are identified by MAC protocol data unit (PDU) subheaders having logical channel identifiers (IDs) different from each other.

11. A user equipment controlling states of a secondary cell, the user equipment comprising:

a receiver configured to receive secondary cell (SCell) state indication information indicating a state for the SCell from a base station through an radio resource control (RRC) message or a medium access control (MAC) control element;

a controller configured to cause a state of the SCell to transition into a dormant state when the SCell state indication information indicates the dormant state; and a transmitter configured to transmit channel state information reporting for the SCell in the dormant state according to a dormant state channel quality indicator (CQI) report period parameter set separately from an activation state CQI report period parameter, wherein the dormant state that allows the user equipment and the base station to perform operations for reporting channel state information for the SCell while restricting to operations for transmitting a sounding reference signal (SRS), uplink shared channel (UL-SCH), and random access channel (RACH) on the SCell, monitoring physical data control channel (PDCCH) on the SCell, and transmitting PUCCH on the SCell, and wherein the SCell state indication information received through the RRC message includes one bit parameter indicating one of an activation state and the dormant state.

12. The user equipment according to claim 11, wherein when the RRC message excludes the SCell state indication information, the controller configures the SCell to be in a deactivation state and changes the state of the SCell to the dormant state according to the MAC control element.

13. The user equipment according to claim 11, wherein the MAC control element including the SCell state indication information has a format including a field for indicating the state of the SCell as one of the activation state and the dormant state for each SCell index.

14. The user equipment according to claim 13, wherein when a value of an index field for the SCell is set to a value indicating the activation state, and the state of the SCell is the dormant state, the controller is configured to transition the state of the SCell to the activation state.

15. The user equipment according to claim 13, wherein when a value of an index field for the SCell is set to a value indicating the activation state, and the state of the SCell is not the dormant state, the controller is configured to ignore the value of the index field.

16. The user equipment according to claim 11, wherein the MAC control element is divided into a first MAC control element indicating a state for each SCell index as one of the activation state and the deactivation state and a second MAC control element indicating a state for each SCell index as one of the dormant state and the activation state, wherein the first MAC control element and the second MAC control element are identified by MAC protocol data unit (PDU) subheaders having logical channel identifiers (IDs) different from each other.

17. The user equipment according to claim 16, wherein when both the first MAC control element and the second MAC control element are received, the controller is configured to determine whether the SCell state indication information indicates the dormant state by combining values of index fields for the SCell included in each of the first MAC control element and the second MAC control element.

* * * * *